Aug. 7, 1951 C. P. BALDWIN ET AL 2,562,881
HYDRAULICALLY DRIVEN VEHICLE AND CABLE
REEL MOTOR CONTROL MEANS
Original Filed Feb. 13, 1941 11 Sheets-Sheet 5
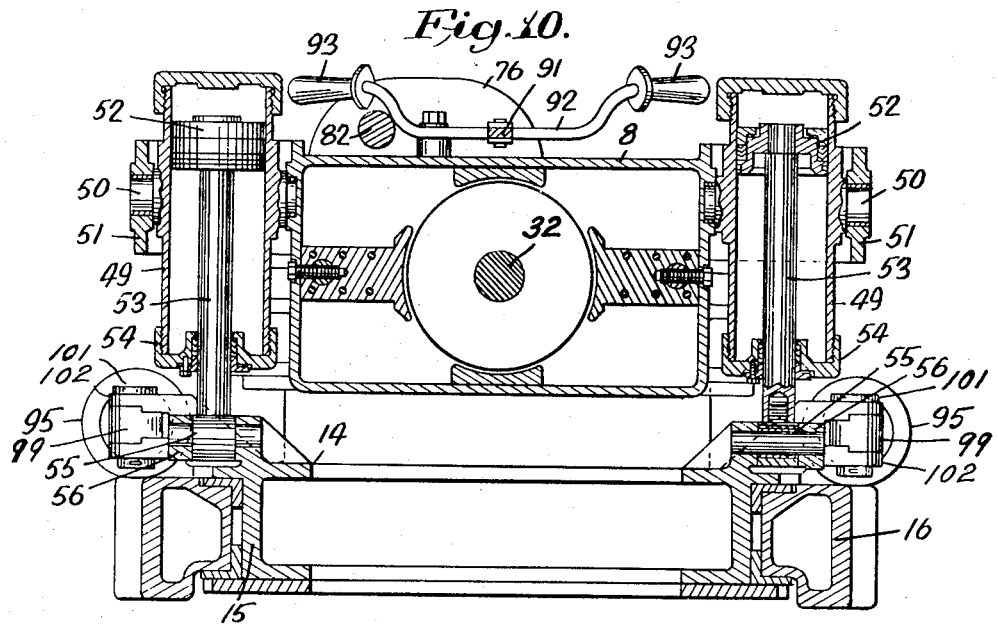
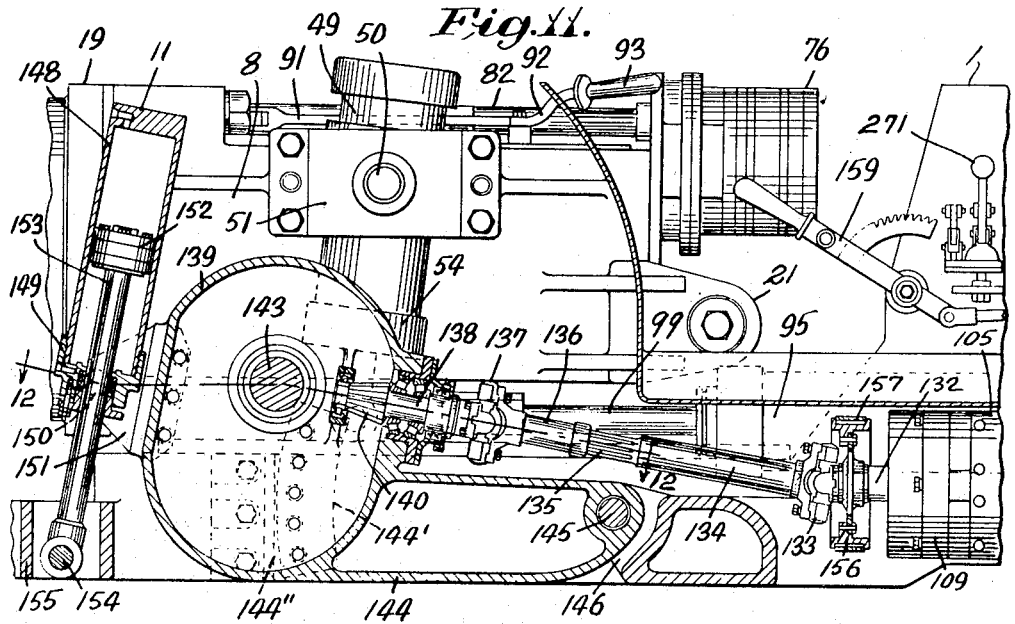
Inventors:
Clyde P. Baldwin.
Harry H. Vanderzee.
by
Louis A. Maxam.
atty.

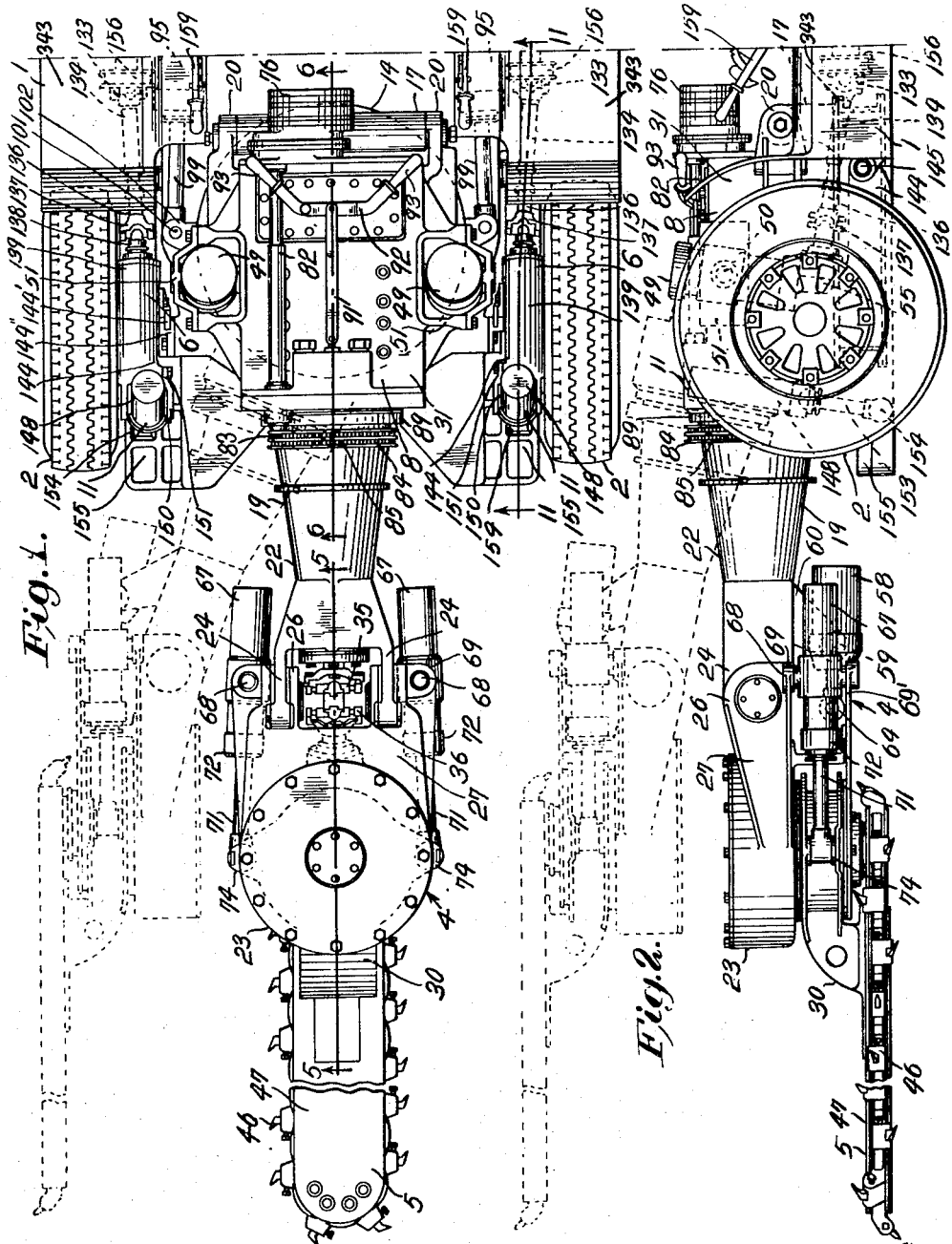

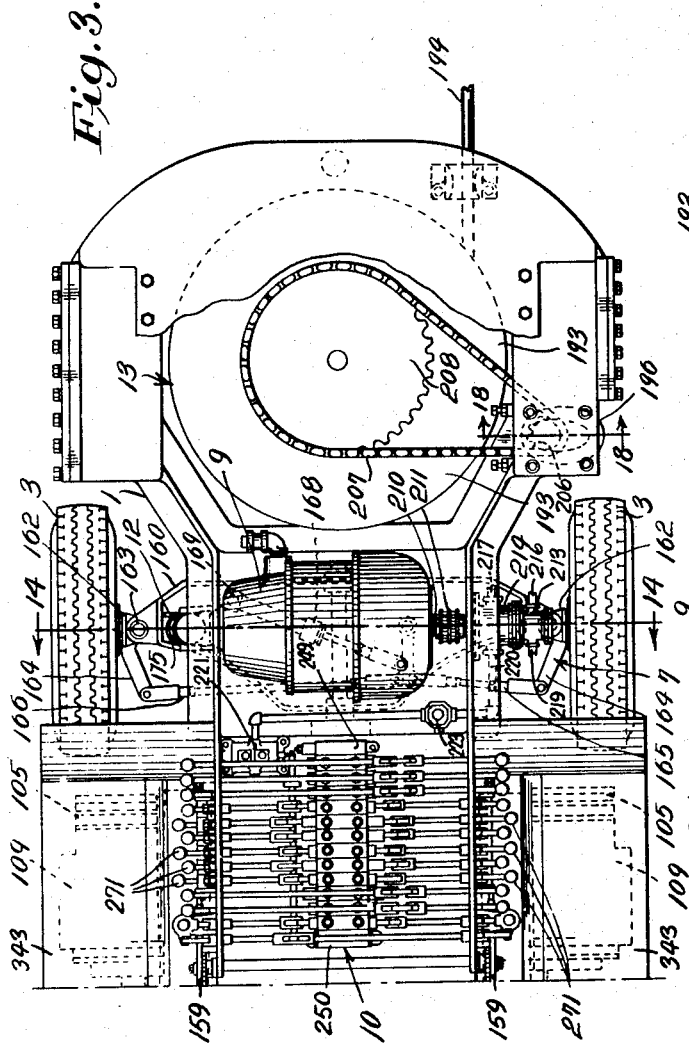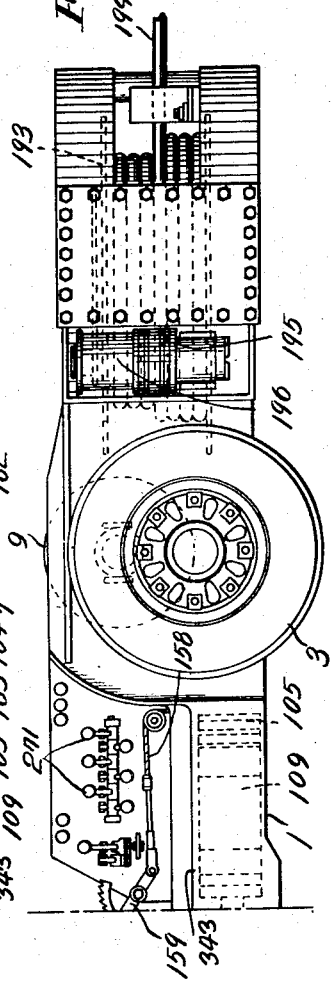

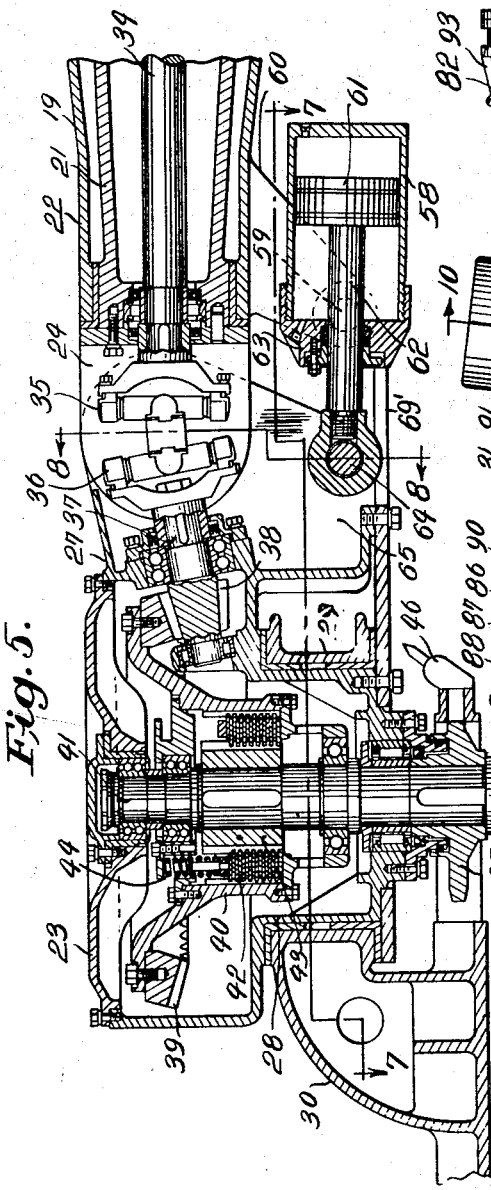

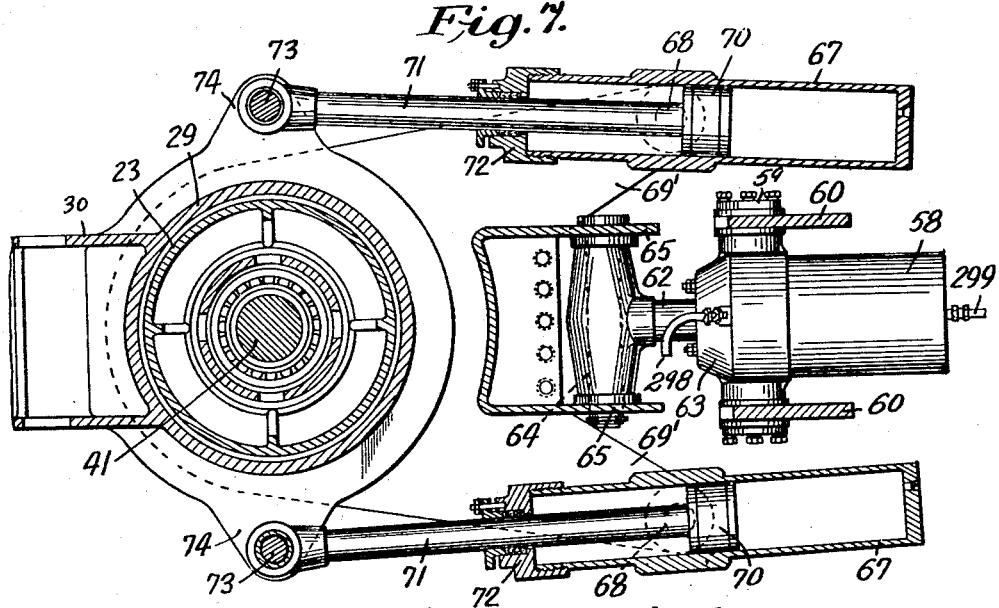
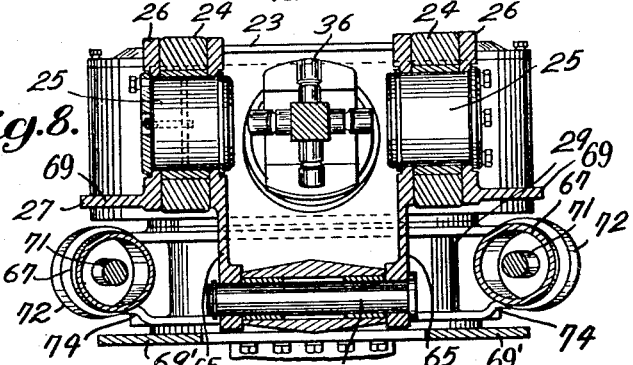
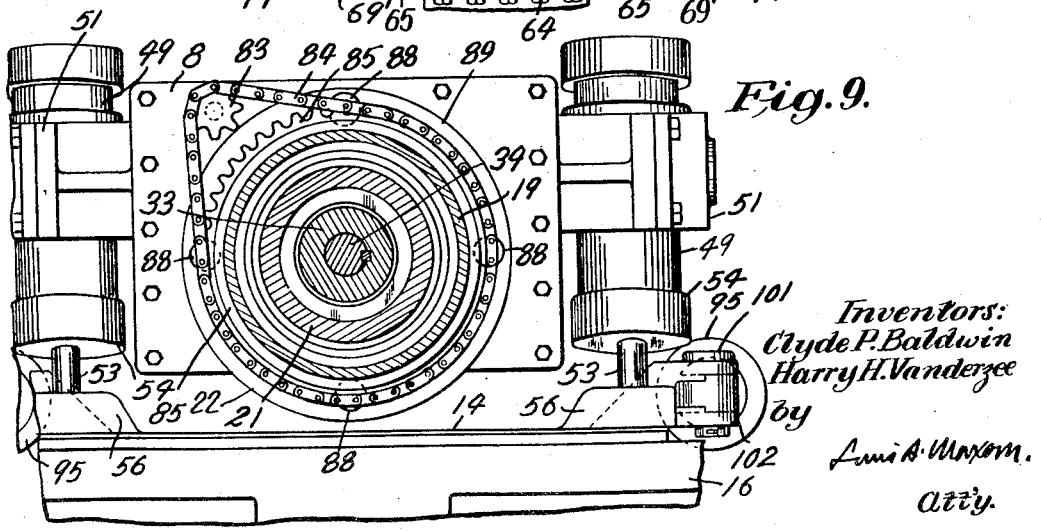

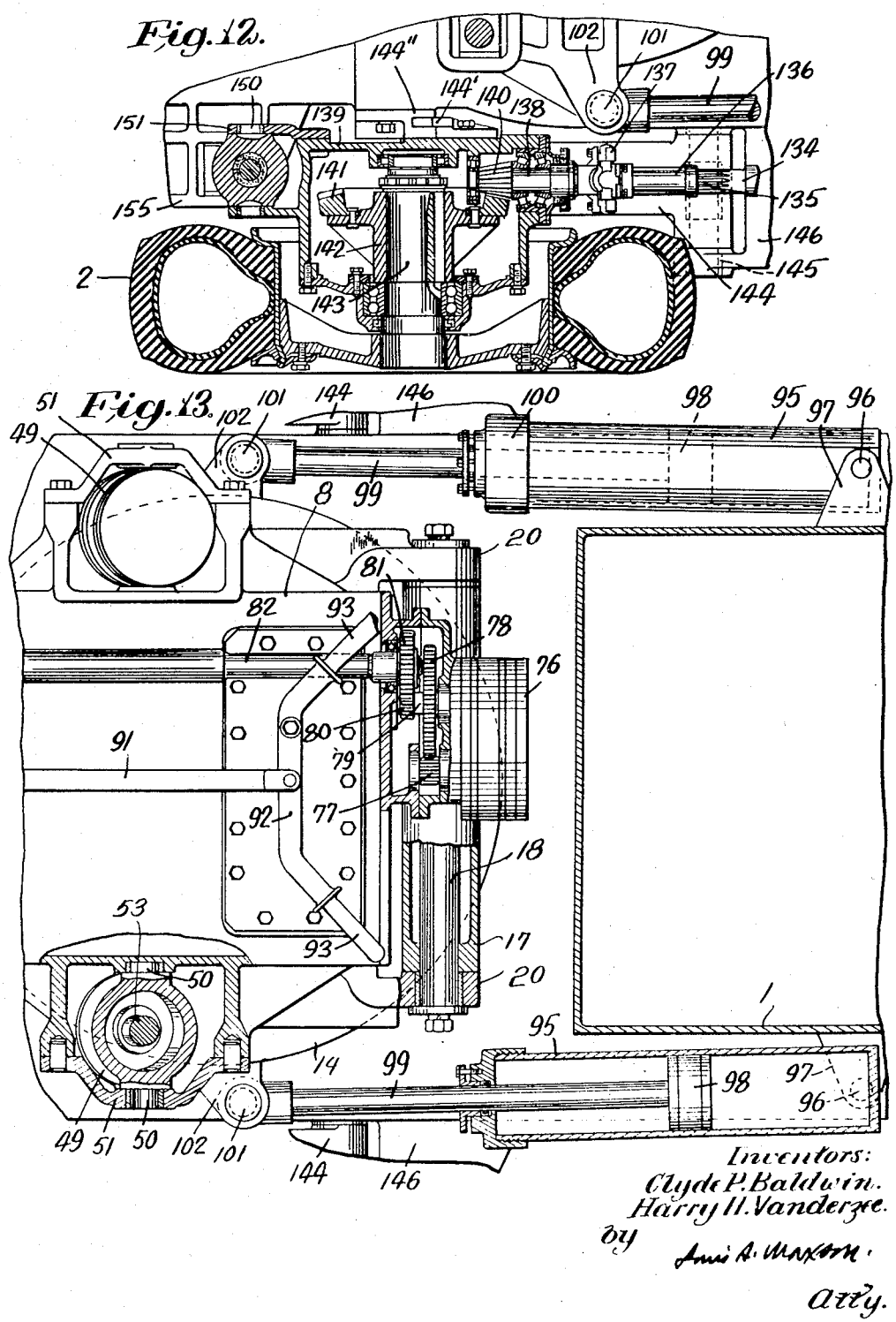

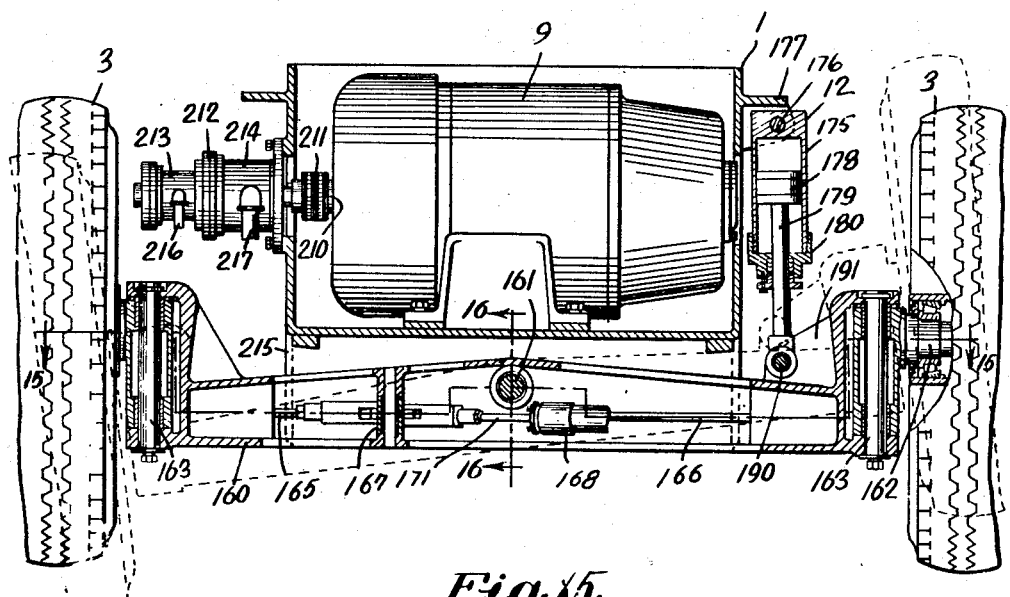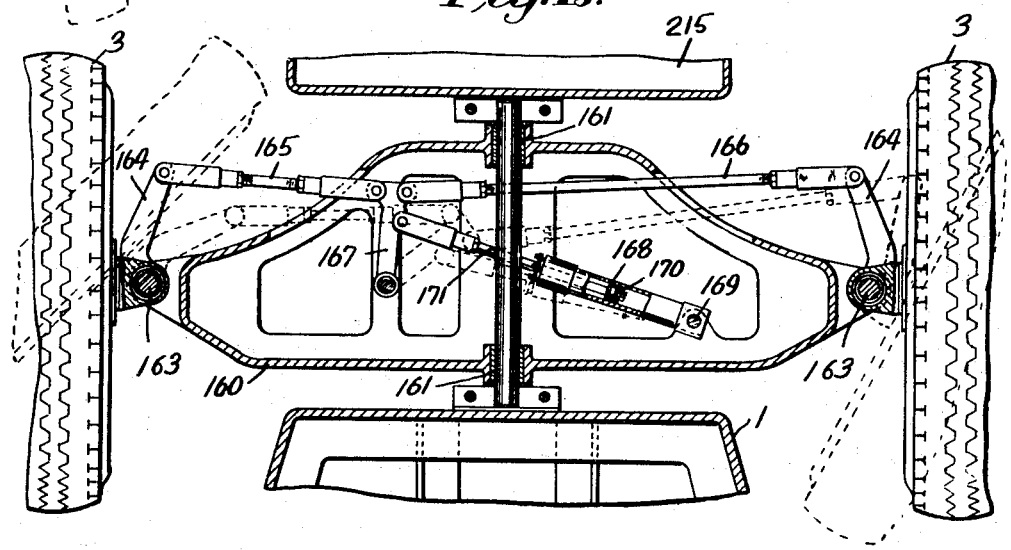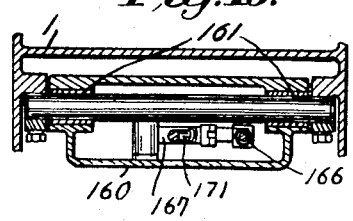

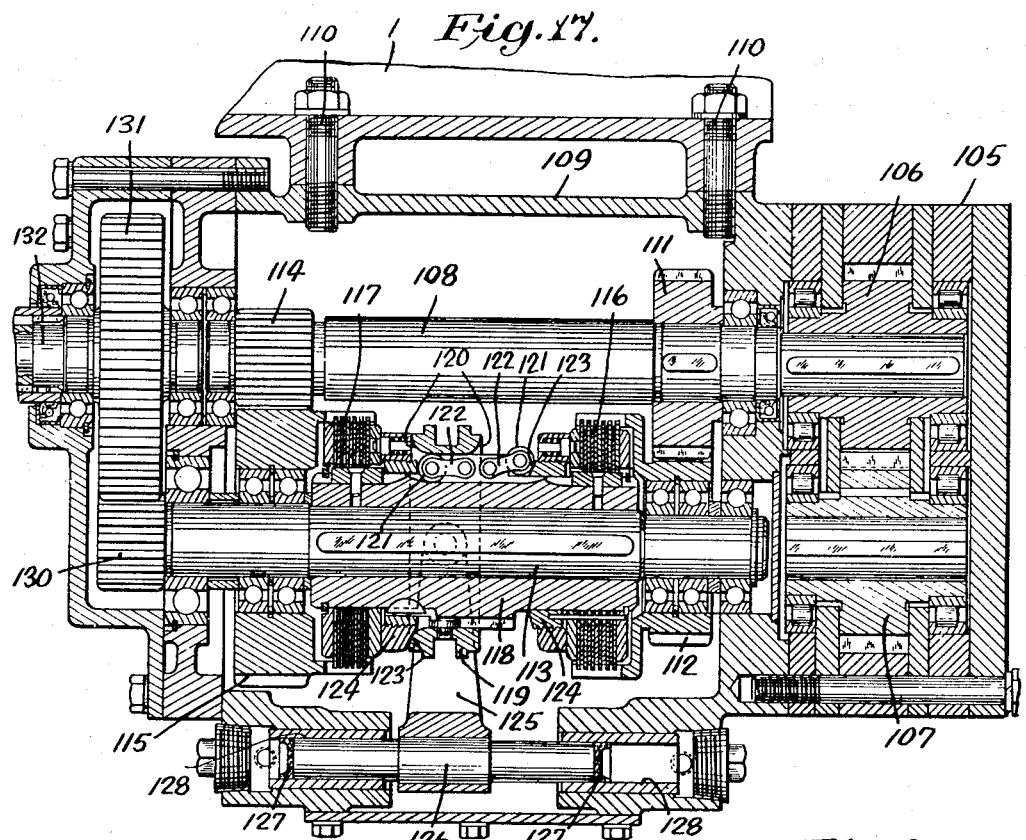
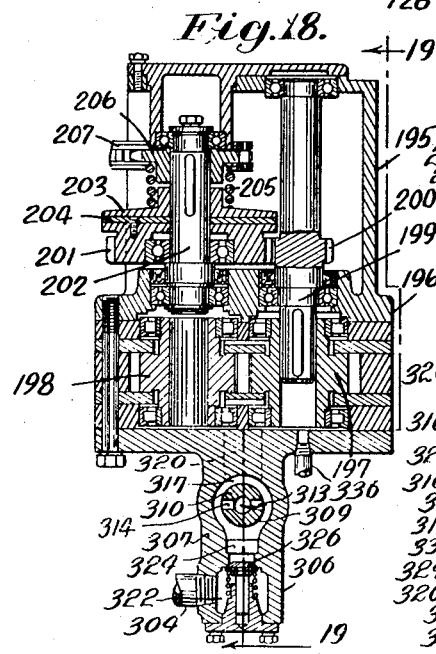
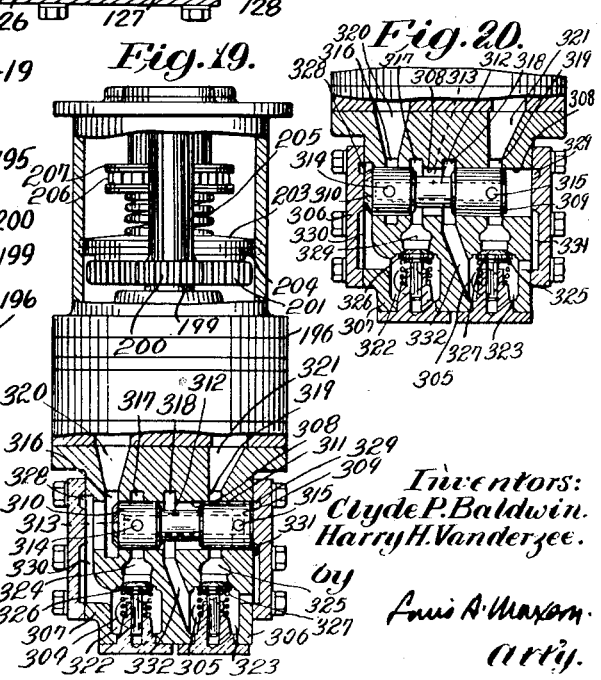

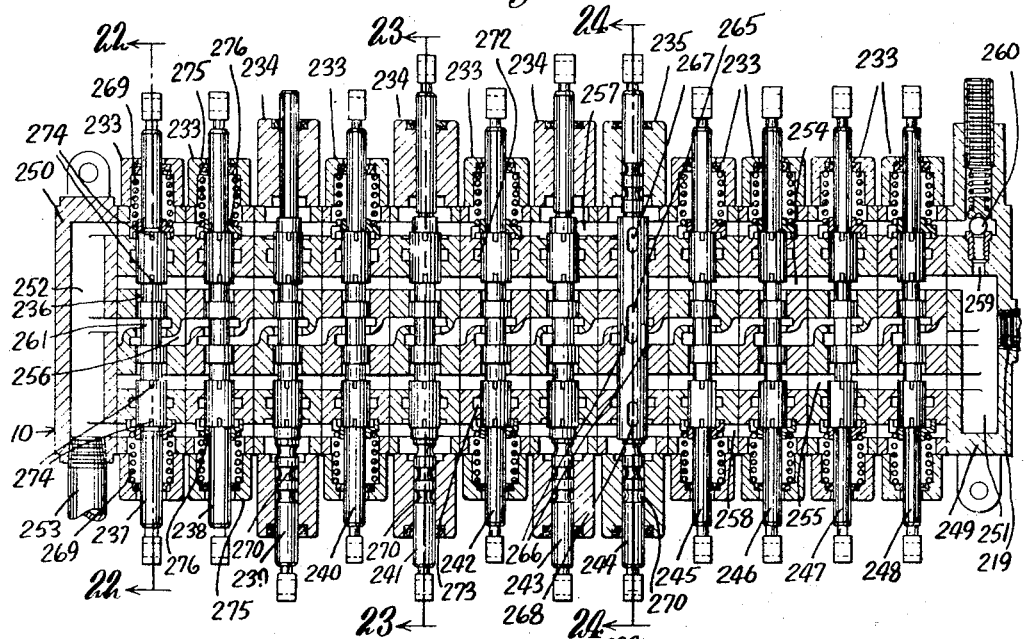
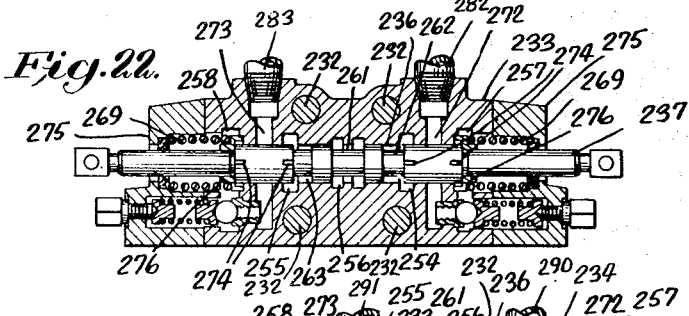
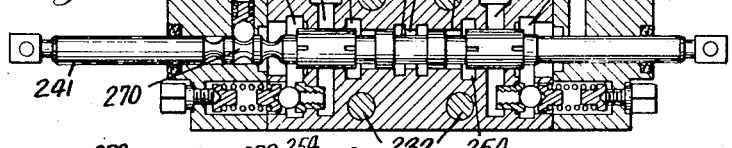
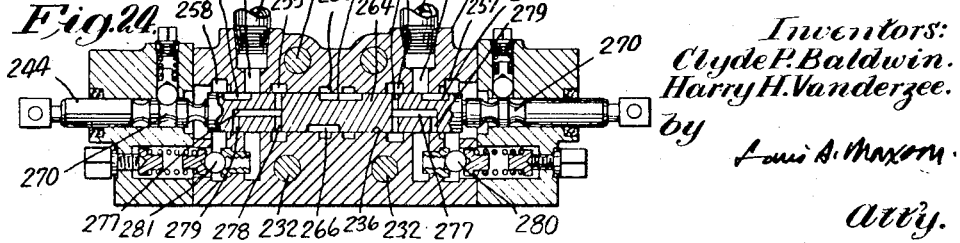

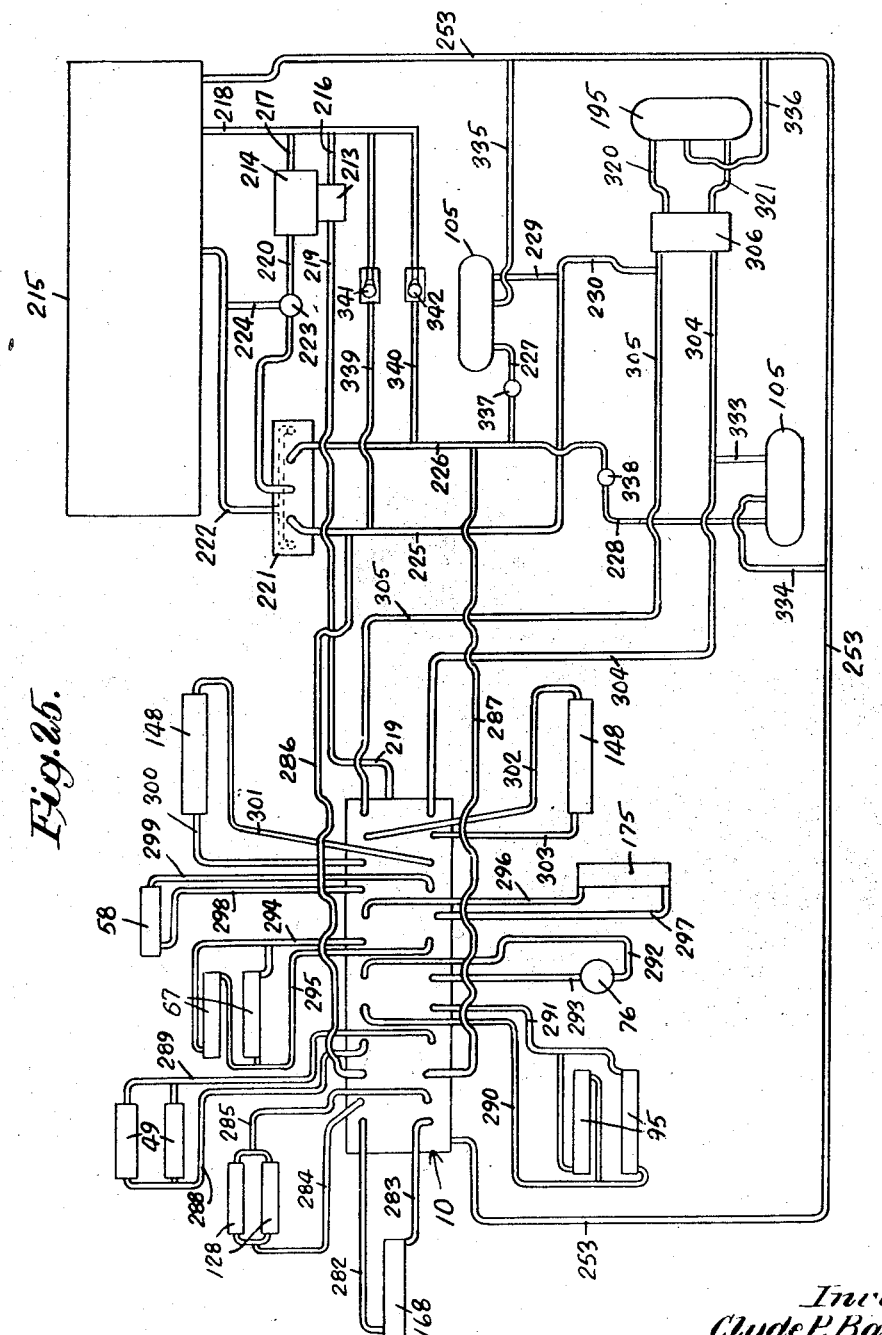

Inventors:
Clyde P. Baldwin.
Harry H. Vanderzee.

Patented Aug. 7, 1951

2,562,881

UNITED STATES PATENT OFFICE 2,562,881

HYDRAULICALLY DRIVEN VEHICLE AND CABLE REEL MOTOR CONTROL MEANS

Clyde P. Baldwin, Claremont, N. H., and Harry H. Vanderzee, Racine, Wis., assignors to Joy Manufacturing Company, a corporation of Pennsylvania Original application February 13, 1941, Serial No. 378,728. Divided and this application February 15, 1945, Serial No. 578,084

23 Claims. (Cl. 180—2)

This invention relates to mining apparatus, and more particularly to improvements in coal mining apparatus of the universal type especially designed for use in trackless coal mines, and capable of performing a number of different functions with efficiency and economy.

An object of the present invention is to provide an improved coal mining apparatus especially designed for use in trackless coal mines, which may be readily maneuvered and is capable of performing a number of different functions with comparative ease. Another object is to provide an improved coal mining apparatus mounted on and propelled and steered by relatively large, pneumatic-tired wheels whereby the uneven floor of a trackless coal mine may be readily traversed, without undue shock and distortion. A further object is to provide a rubber-tired coal mining apparatus which is of a relatively compact construction and having relatively great flexibility permitting ready maneuverability of the apparatus in confined spaces in underground coal mines. Another object is to provide improved traction wheel mountings and driving means for the traction wheels. Yet another object is to provide an improved coal mining apparatus having an improved power operated steering mechanism whereby the apparatus may be readily steered through the sharply curved and relatively restricted passages of a coal mine. A further object is to provide an improved coal mining apparatus having an improved cable reel, and improved driving and controlling means therefor. A still further object is to provide an improved coal mining apparatus having an improved hydraulic system which embodies improved control valve means for controlling the flow of fluid under pressure with respect to the various hydraulically operated devices. Still another object is to provide an improved coal mining apparatus having novel combinations and arrangements of parts. Further objects and advantages will become apparent as the description proceeds.

The improved mining apparatus, according to a preferred embodiment of the invention, may, for purposes of convenience, be mounted on relatively large, pneumatic-tired wheels whereby the same may move about the mine without the use of a trackway, and be provided with propelling and steering mechanism whereby the same may be propelled at any desired speed and may be readily maneuvered through the sharply curved and relatively restricted passages of a coal mine. The invention, from the standpoint of a number of its aspects, may be of the universal type capable of performing a number of different functions with efficiency and economy, in that kerfs may be cut in a coal seam at various locations. The kerf cutting mechanism of the apparatus selected for the illustrative embodiment of the invention may have relatively great flexibility whereby the same may be positioned to cut horizontal kerfs in the coal face at either the floor or the roof level, or at any desired intermediate level, and also to cut shearing kerfs in various planes perpendicular or inclined with respect to said horizontal kerfs, and also to cut horizontal and vertical kerfs in the ribs at either side of the coal face. The apparatus may embody hydraulically operated propelling means for driving the front traction wheels at any speed between zero and a predetermined maximum; and hydraulically operated steering mechanism may be associated with the rear steering wheels whereby the apparatus may be readily and easily steered. The apparatus may also embody, to effect the various adjustments of the kerf cutting mechanism, hydraulically operated adjusting means which may be readily controlled so that any desired speed of adjustment and movement may be obtained. All the different functions of the apparatus may be performed as the results of simple manipulations and adjustments, and the adjustments may be performed quickly and with a minimum of skill and labor, due to the foolproof manner of control. The apparatus may move over an uneven mine floor without undue strain or distortion, and by the provision of hydraulically operated levelling and stabilizing mechanism the apparatus may be readily levelled, for cutting, and tilting tendency of the apparatus during certain kerf cutting operations may be offset. By the provision of a novel hydraulic system embodying improved control valve means the flow of liquid under pressure with respect to the various hydraulically operated devices may be readily controlled, to obtain the most advantageous results. The arrangement of the apparatus is compact and the parts are designed to provide proper balance. While the various features mentioned may all be included in a preferred embodiment of the invention, it will be apparent that the latter is capable of wide variations in different embodiments, and, accordingly, reference to the appended claims should be had for a knowledge of the scope of the invention.

In the accompanying drawings, in which there is shown for purposes of illustration one form which the invention may assume in practice, Figs. 1 and 3, when taken together, constitute a plan view of the improved mining apparatus, with a portion of the top cover broken away to facilitate illustration.

Figs. 2 and 4, when taken together, constitute a side elevational view of the mining apparatus shown in Figs. 1 and 3.

Fig. 5 is an enlarged vertical sectional view taken substantially on line 5—5 of Fig. 1.

Fig. 6 is an enlarged vertical sectional view taken substantially on line 6—6 of Fig. 1, with parts omitted.

Fig. 7 is a horizontal sectional view taken substantially on line 7—7 of Fig. 5.

Fig. 8 is a cross-section view taken substantially on line 8—8 of Fig. 5.

Fig. 9 is a cross-sectional view taken substantially on line 9—9 of Fig. 6.

Fig. 10 is a cross-sectional view taken substantially on line 10—10 of Fig. 6.

Fig. 11 is an enlarged view in longitudinal vertical section taken substantially on line 11—11 of Fig. 1.

Fig. 12 is a detail sectional view taken substantially on line 12—12 of Fig. 11.

Fig. 13 is a horizontal sectional view showing details of the turntable mounting, turntable rotating means and the motor for rotating the cutter head.

Fig. 14 is an enlarged cross-sectional view taken on line 14—14 of Fig. 3.

Fig. 15 is a horizontal sectional view taken substantially on line 15—15 of Fig. 14.

Fig. 16 is a detail vertical sectional view taken substantially on line 16—16 of Fig. 14.

Fig. 17 is a vertical sectional view taken through one of the traction wheel driving motors and its associated transmission mechanism.

Fig. 18 is an enlarged vertical sectional view taken substantially on line 18—18 of Fig. 3, showing a portion of the driving means for the cable reel.

Fig. 19 is a vertical sectional view taken substantially on line 19—19 of Fig. 18 with parts shown in full, and a portion of the casing broken away.

Fig. 20 is a fragmentary sectional view taken on the plane of Fig. 19, showing the valve in a different position.

Fig. 21 is a horizontal sectional view through the control valve mechanism.

Fig. 22 is a vertical sectional view taken substantially on line 22—22 of Fig. 21.

Fig. 23 is a vertical sectional view taken substantially on line 23—23 of Fig. 21.

Fig. 24 is a vertical sectional view taken substantially on line 24—24 of Fig. 21.

Fig. 25 is a diagrammatic view illustrating the hydraulic system embodying the control valve mechanism shown in Fig. 21.

Figure 26:
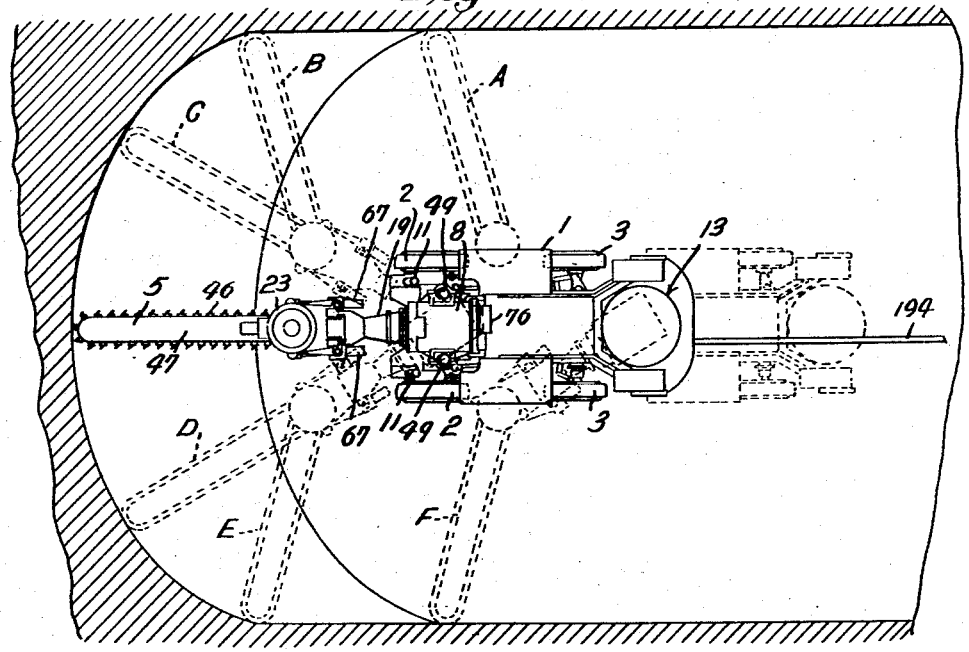
Fig. 26 is a diagrammatic plan view illustrating the improved mining apparatus in a mine entry with the kerf cutting mechanism in horizontal cutting position.

In the illustrative embodiment of the invention there is shown a coal mining apparatus of the universal type especially designed for use in trackless coal mines. It will be evident, however, that various features of the invention may be embodied in mining apparatus of various other types, and, if desired with respect to such features, the apparatus may be mounted on track wheels to travel along a mine trackway, or may be tractor-tread mounted.

The mining apparatus illustrated generally comprises a main frame or body 1 mounted on front traction wheels 2 and rear steering wheels 3. The main frame or body carries at its forward end adjustable kerf cutting mechanism, generally designated 4, including a kerf cutter 5. The front traction wheels have driving means, generally designated 6, 6, while associated with the rear steering wheels is power operated steering mechanism, generally designated 7. A motor 8 drives the kerf cutter, while a separate motor 9 drives the pumping means of the hydraulic system, and the latter embodies control valve mechanism, generally designated 10. Levelling, or adjusting devices 11, 11 are associated with the mountings for the front traction wheels, while a stabilizing device 12 is associated with the mounting for the rear steering wheels. A cable reel mechanism, generally designated 13, is arranged at the rear end of the main frame or body.

Now referring to the kerf cutting mechanism 4, it will be noted that carried at the front end of the main frame or body 1 intermediate the front traction wheels is a horizontal turntable 14 having a generally annular horizontal frame 15 (Figs. 6 and 10) journaled in bearing sleeves supported by an annular bearing support portion 16 of the machine body. The turntable frame has, near its rear edge, an upstanding bracket 17 which, as shown in Fig. 13, supports a horizontal pivot shaft 18, and an elongated arm structure or boom 19 has brackets 20 at its rear end pivotally mounted on the projecting ends of the pivot shaft 18, in the manner shown. The arm structure or boom overlies the turntable and extends forwardly in advance of the forward end of the main frame or body; and the intermediate portion of the boom, considered as a whole, has a projection 21 (Figs. 5 and 6) providing spaced bearings on which is journaled the bearing portion 22 of a rotatable cutter carrying head 23, which constitutes the outer portion of the boom. It is accordingly evident that the cutter carrying head may rotate upon the longitudinal axis of the boom upon an axis perpendicular to a line parallel to the boom pivot axis. The bearing portion 22 of the boom has a yoke-shaped outer portion including side arms 24, 24 which support alined pivot pins 25 on which brackets 26 integral with a cutter support frame 27 are pivotally mounted, as shown in Fig. 8, thereby to enable the cutter carrying head 23 to swing about an axis at right angles to the axis of boom rotation. The cutter support 27 of the rotatable cutter carrying head 23 has a cylindrical bearing support 28 which supports bearing sleeves on which the circular bearing portion 29 of a cutter carrying hanger frame 30 is pivotally mounted to swing upon an axis at right angles to a line parallel to and forward of the cutter support pivot axis.

The motor 8 is arranged at the rear portion of the boom, and the casing 31 of this motor constitutes the rearward portion of the boom. This motor is preferably of the electric type and has its armature shaft 32 arranged with its axis of rotation in line with the axis of rotation of the cutter carrying head. As shown in Fig. 6, connected by a coupling 33 to the front end of the motor shaft 32 is an alined shaft 34 journaled at its forward end in a bearing supported at the front end of the bearing support 21 of the intermediate boom portion.

Various means may be employed to connect the shaft 34 with the cutting devices, to effect drive of the latter in the various positions thereof, but herein there is shown keyed to the front end of the shaft 34 an element of a conventional universal joint 35 (Fig. 5) which is in turn connected to a conventional universal joint 36, the latter having an element keyed to a shaft 37 journaled in bearings supported within the frame of the tiltable cutter carrying head 23. Keyed to and driven by the shaft 37 is a bevel pinion 38 meshing with and driving a bevel gear 39. As shown in Fig. 5, the bevel gear 39 has its hub 40 journaled by means of bearings supported by a drive shaft 41, the latter in turn journaled in bearings supported within the tiltable cutter carrying head. The bevel gear hub 40 may be connected in various ways, and is herein shown as connected by interleaved clutch discs 42 and a sleeve 43 keyed to the shaft 41. These clutch discs are loaded by springs 44 set at a predetermined pressure, so that the clutch may slip automatically upon overload. Keyed to and driven by the shaft 41 is a chain sprocket 45 which engages and drives an endless cutter chain 46 of the kerf cutter. The kerf cutter includes an elongated plane cutter bar 47 on the margin of which the cutter chain is guided for circulation, and this cutter bar is carried by the swiveled hanger frame 30. It will thus be seen that the cutter chain may be driven through the connections above described irrespective of the position of the cutter head about its axis, the tilted position of the cutter support, or the swiveled position of the bar hanger frame.

For swinging the boom in a vertical direction about its pivot relative to the turntable, there are provided, at the opposite sides of the boom, upright hydraulic cylinders 49 having lateral trunnions pivotally mounted at 50 in brackets 51 rigidly secured to the boom. As shown in Fig. 10, these cylinders contain pistons 52 fixed to piston rods 53 which extend downwardly through the packed lower cylinder heads 54 and are pivotally connected at 55 at their lower ends to brackets 56 secured to the top of the turntable frame 15. The pivotal axes of the cylinders 49 and the axes of pivotal connection of the piston rods with the turntable frame are parallel to the pivotal axis of the boom, so that when the boom is swung the cylinders and piston rods swing about their respective pivots.

The cutter support 27 may be swung about its pivot relative to the rotatable boom portion 22 in various ways, and is herein shown as adapted to be so swung by a hydraulic cylinder 58 (see Fig. 5) arranged at the same side of the cutter support as the kerf cutter and pivotally mounted at 59 on projections 60 integral with the boom portion 22. Reciprocable in this cylinder is a piston 61 having its piston rod 62 extending forwardly through the packed front cylinder head 63 and pivotally connected at 64 to projections 65 integral with the cutter carrying head 23. The cylinder and piston rod pivot axes are parallel with the pivotal axes of the cutter carrying head 23. The means for swinging the bar hanger frame on its bearing mounting relative to the cutter carrying head 23 to effect cutter bar swing comprises hydraulic cylinders 67 (Fig. 7) arranged at the opposite sides of the tilt cylinder 58 and suitably supported, these being herein shown as pivotally mounted at 68 on brackets 69 integral with the cutter carrying head 23, and also on lower brackets 69' rigidly connected to the cutter carrying head 23, and these cylinders contain reciprocable pistons 70 having their piston rods 71 extending forwardly through the packed front cylinder heads 72 and pivotally connected at 73 to projecting lugs 74 integral with the hanger frame 30. The pivotal axes of the cylinders and piston rods are parallel to the swivel axis of the hanger frame. It will thus be seen that when liquid under pressure is supplied to one end or the other of the cylinders above described the associated parts may be swung about their respective pivotal axes, and when the liquid is trapped in these cylinders the parts are locked against pivotal movement. The means for supplying liquid under pressure to these cylinders will later be described.

The cutter head rotating means for rotating the cutter carrying head 23 about the longitudinal axis of the boom may assume various suitable forms, and as herein shown comprises a conventional hydraulic motor 76 mounted on the motor casing at the rear end of the boom. This motor is of the reversible type and has a spur pinion 77 fixed to its power shaft and meshing, as shown in Fig. 13, with a spur gear 78 secured to a shaft 79 suitably journaled within the motor casing. Secured to the shaft 79 is a spur gear 80 meshing with a spur gear 81 keyed to a longitudinal shaft 82. This shaft extends longitudinally over the top of the motor casing, as shown in Figs. 6 and 10, and is suitably journalled in bearings supported by the boom. Fixed to the forward end of the shaft 82, near the forward end of the motor, is a chain sprocket 83 which engages and drives an endless chain 84 which in turn engages a chain sprocket 85 formed on the rotatable boom portion 22 which supports the rotatable cutter head. It is accordingly evident that, depending on the direction of motor rotation, the cutter head may be rotated in one direction or the other about the longitudinal axis of the boom. For locking the cutter head against rotation there is provided a reciprocable locking pin 86 guided in a bore 87 on the top of the boom and receivable in appropriately located locking apertures 88 formed on a flange 89 integral with the rotatable boom portion 22. A coil spring 90 constantly urges the locking pin toward its foremost, locking position, and the pin is withdrawable from its locking aperture against the action of the spring through a link 91 connected to a pivoted operating lever 92 arranged at the top of the motor casing. This lever has grasping portions 93, 93 arranged at the opposite sides of the boom, so that the locking pin may be operated from either side of the apparatus.

The rotating means for the turntable 15 as herein shown comprises horizontal hydraulic cylinders 95 (Fig. 13) pivotally mounted at 96 within brackets 97 secured to the sides of the body of the apparatus. Contained in these cylinders are reciprocable pistons 98 having their piston rods 99 extending forwardly through the packed front cylinder heads 100 and pivotally connected at their forward ends at 101 to projecting lugs 102 integral with the turntable frame 15 at the sides of the turntable. The pivots of the cylinders and piston rods are parallel to the axis of turntable rotation. When liquid under pressure is supplied to one or the other of these cylinders, the turntable may be rotated in one direction or the other, and when the liquid is trapped within these cylinders the turntable is locked against rotation. The means for supplying liquid under pressure to the turntable rotating cylinders will be later described.

Now referring to the traction wheel driving means 6, 6, it will be noted that, in the embodiment of the invention illustrated, mounted at the opposite sides of the main frame or body 1, between the front and rear wheels, are hydraulic motors 105, 105. These motors are of the reversible type and each comprises intermeshing motor rotors 106, 107 suitably journaled within the motor casing. Since these motors and the transmission means between the rotors and the traction wheels are identical in design, a description of the drive for one traction wheel will suffice for both. As shown in Fig. 17, the motor rotor 106 is keyed to a transmission shaft 108 suitably journaled within bearings supported within a gear housing 109 secured, as by screws 110, to the machine body. Keyed to the shaft 108 is a high speed gear 111 meshing with a gear 112 journaled on bearings supported by a longitudinally extending shaft 113. The shaft 113 is arranged in parallelism with the shaft 108 and is likewise journaled within bearings supported within the housing 109. Secured to the shaft 108 is also a slow speed gear 114 meshing with a large gear 115 arranged coaxial with the gear 112 and likewise supported in bearings supported by the shaft 113. The gears 112 and 115 constitute the high and low speed terminal gears respectively of the high and low speed transmissions, and are selectively connectible to the shaft 113 by means of disc clutches 116 and 117. These clutches comprise interleaved clutch discs secured to sleeves integral with the gears and to a sleeve 118 keyed to the shaft 113. The clutch operating means comprises a shipper ring 119 splined to the sleeve and having cam surfaces 120 engageable with rollers 121 carried by pivoted links 122 mounted on the sleeve 118. These rollers are engageable with cam surfaces 123 formed on sleeves 124 surrounding and slidably mounted on the sleeve 118. Engaging an annular groove on the exterior of the shipper member 119 is a shipper yoke 125 secured to a reciprocable member 126. Formed on the opposite ends of the member 126 are oppositely acting pistons 127, 127 contained in the bores of hydraulic cylinders 128. It will thus be seen that when liquid under pressure is supplied to one or the other of the cylinders 128 the shipper member 119 may be shifted in one direction or the other to apply, through the cam and roller devices, one clutch or the other, and as a result the shaft 113 may be driven at relatively high or low speeds in the same direction. The means for supplying liquid under pressure to the cylinders 128 will later be described. Secured to the forward end of the shaft 113 is a spur gear 130 meshing with a spur gear 131 secured to a longitudinal shaft 132. The shaft 132 is connected, through a conventional universal joint 133, to a shaft 134 which has telescopic splined connection at 135 with a shaft 136. The shaft 136 is connected through a conventional universal joint 137 to a shaft 138 suitably journaled within a gear housing 139. Fixed to and driven by the shaft 138 is a bevel gear 140 meshing with a bevel gear 141 having its hub 142 keyed to a front axle 143 to which a front traction wheel is secured. The gear housing 139 is formed integral with a swing- able traction wheel mounting 144 pivoted at 145 on a bracket 146 integral with the body of the apparatus, and the telescopic splined connection between the shafts 134 and 136 and the universal joints permit relative swinging movement between the wheel mounting and the main body without interrupting the wheel drive. To guide the traction wheel mountings relative to the body of the apparatus, each mounting 144 has on its side towards the body an arcuate guide element 144' which is adapted to move in the guides 144'' secured to the body of the apparatus. From the foregoing it is evident that the front traction wheels may be driven by the hydraulic motors 105 through the connections above described at either a relatively high maneuvering speed or a relatively low speed appropriate for cutting.

Associated with the traction wheel mountings 144 are the levelling devices 11, 11, above referred to. The levelling devices each comprise a hydraulic cylinder 148 (see Fig. 11) having its lower head 149 provided with lateral trunnions pivotally mounted at 150 within a bracket 151 secured to a wheel mounting 144. Contained in the cylinder 148 is a piston 152 having its piston rod 153 extending downwardly through the packed lower cylinder head and pivotally connected at 154 to a projection 155 integral with the machine body. Liquid under pressure may be supplied to the cylinders 148, 148 either independently or concurrently to effect swinging of the wheel mountings about their pivots relative to the main frame 1, thereby to enable levelling of the main frame when the apparatus is supported on an uneven mine floor. When the liquid is trapped within these cylinders, the parts are locked in adjusted position. The means for supplying liquid under pressure to the levelling cylinders will be later described.

Associated with each of the driving means for the front traction wheels is a band brake each comprising a brake drum 156 (Fig. 11) secured to the shaft 132 and having a cooperating brake band 157. These brakes are provided with operating means comprising flexible shafts 158 (Fig. 4) guided by suitably located guide rolls and connected to operating levers 159, 159 conveniently arranged at the opposite sides of the apparatus.

Now referring to the mounting for the rear steering wheels, it will be noted that a transverse rear axle 160 is pivotally connected at 161 (Figs. 14, 15 and 16) to the bottom of the main frame 1, and the axis of pivotal connection lies in the central longitudinal vertical plane of the apparatus. Swiveled axles 162 are pivotally mounted on vertical pivot pins 163 carried at the opposite ends of the transverse axle 160. Different suitable means for swinging the axles 162 to effect steering might be used, but as shown herein the swiveled axles have projecting arms 164 connected by adjustable cross rods 165 and 166 to a lever 167. For effecting movement of the steering wheels a hydraulic cylinder 168 is pivotally mounted at 169 on the transverse axle 160. This cylinder contains a reciprocable piston 170 having its piston rod 171 pivotally connected to the lever 167. It is accordingly evident that when liquid under pressure is supplied to one end or the other of the cylinder 168 the steering wheels may be turned in one direction or the other about their pivotal mountings at the opposite ends of the transverse axle 160 through the lever 167, cross rods 165, 166 and arms 164. By reason of the linkage arrangement shown, differential adjustment of the wheels is effected whereby the wheel which is at the inside of any turn is swung more sharply.

The "stabilizing" device 12 associated with the rear wheel mounting comprises a vertical cylinder 175 pivotally mounted at its upper end at 176 on a bracket 177 secured to one side of the machine body. Contained in this cylinder is a piston 178 having its piston rod 179 extending downwardly through the packed lower cylinder head 180 and pivotally connected at 190 at its lower end to projections 191 integral with the transverse axle 160 near one end of the latter as shown in Fig. 14. Liquid may be trapped in the stabilizing cylinder 175 at the opposite sides of the piston to hold the body of the apparatus rigidly against tilting movement about its pivotal connection at 161 with the transverse axle 160, or the piston may be allowed to float, and by supplying liquid to one end or the other of the cylinder a substantial redistribution of weight among the several wheels, as compared with that when there is free turning at the pivot 161, is possible. In running around the mine it is evident that it will be advantageous to have the rear axle 160 free to pivot with respect to its pivot 161. When the cutter bar is going to be swung to one side it is desirable, however, to have the axle locked, for this will fix the axis about which tilting would take place to a line connecting the points of contact with the bottom of the front and back wheels at the side of the machine towards which the cutter bar is to be swung. With the axle 160 free to float, the tilt line would extend approximately from the point of contact of the front wheel with the mine bottom to a point in the axis of the pivot shaft 161.

Also, if the machine were to tend to lose traction because the momentarily more heavily loaded one of the driving wheels engaged a slippery spot, suitable admission of fluid to the piston 175 can be used to impose more of the weight of the machine on the wheel which can obtain traction.

As previously mentioned a cable reel mechanism 13 is arranged at the rear end of the main frame 1. This reeling mechanism comprises a cable reel 193 (Figs. 3 and 4) of relatively large diameter arranged in an extremely vertically compact manner within the vertical limits of the main frame and journaled to rotate about a vertical axis lying in the central longitudinal vertical plane of the apparatus. Wound on the reel is a conductor cable 194 by which motive power may be conducted to the motors 8 and 9, in a well known manner. The cable reel may be driven in various ways, but as herein shown is driven in a direction to wind in the conductor cable by a hydraulic motor 195 having its housing 196 secured to the side of the machine body. This motor comprises intermeshing motor rotors 197 and 198 journaled within bearings supported within the housing, as shown in Fig. 18. The rotor 197 is keyed to a vertical shaft 199 (Fig. 18) likewise journaled within bearings supported within the housing. Secured to this shaft is a spur gear 200 meshing with a spur gear 201 journaled on a vertical shaft 202 herein arranged parallel with the shaft 199 and likewise journaled within bearings supported within the housing. Splined to the shaft 202 is a clutch member 203 which is held in frictional engagement with a friction plate 204 secured to the gear 201 by a coil spring 205. This clutch is set at a predetermined load and is adapted automatically to slip upon overload. Keyed to the shaft 202 near its upper end is a chain sprocket 206 connected by an endless drive chain 207 to a chain sprocket 208 secured to the reel. The means for controlling the supply of liquid under pressure to the reel motor will be hereinafter more fully described.

Referring to the hydraulic system, it will be observed that the motor 9 has its power shaft 210 (Fig. 14) connected by a flexible coupling 211 to the drive shaft of pumping means 212. The pumping means may comprise two distinct pumping units, but, in this instance, comprises a dual pumping means having a pump 213 of low capacity discharge and a pump 214 of high capacity discharge. The control valve mechanism 10 is mounted in a horizontal position on the top of the machine body, as shown in Fig. 3, and beneath the valve mechanism is a liquid tank 215. As shown diagrammatically in Fig. 25, the pumps 213 and 214 have their intakes respectively connected by conduits 216 and 217 to a liquid supply conduit 218 leading to the tank, while the pump discharges are respectively connected to conduits 219 and 220. The discharge conduit 220 of the large capacity pump 214 leads to a conventional manually controllable four-way valve device 221, which has its valve-receiving bore connected by a conduit 222 to the tank. The large capacity pump discharge conduit has a relief valve 223 connected by a conduit 224 to the conduit 222 leading to the tank, and this relief valve is set to open automatically in the event the pressure in the system reaches a predetermined maximum, thereby to prevent overload of the system. Also leading from the valve-receiving bore of the four-way valve device are conduits 225 and 226, the latter being connected through branch conduits 227 and 228 to the traction wheel driving motors 105. The conduit 225 is connected through branch conduits 229 and 230 to the traction wheel driving motors 105, the conduit 230 being connected to its motor through the by-pass valve for the cable reel driving motor, as will later be described.

The control valve mechanism 10 comprises a valve box assembly consisting of a number of valve box sections rigidly secured together by tie bolts 232. Certain of the box sections are identical, and the different sections are designated 233, 234 and 235 and all have valve-receiving bores 236. Contained in the bores of the different valve box sections are slide valves 237, 238, 239, 240, 241, 242, 243, 244, 245, 246, 247 and 248, and these valves control the flow of liquid under pressure from the discharge of the small capacity pump 213 to the various hydraulic motors. Secured to the end valve box sections are intake and discharge sections 249 and 250. The small capacity pump has its discharge conduit 219 connected to a supply passage 251 in the intake section 249, and the discharge passage 252 in the discharge section 250 is connected by a return conduit 253 back to the tank. Parallel longitudinal passages 254 and 255 extend through all of the valve box sections and communicate with the supply passage 251 but are blocked off from the discharge passage 252 by the wall of the discharge section 250, in the manner shown in Fig. 21. Also extending longitudinally through all of the valve box sections midway between the parallel passages 254 and 255 is a center by-pass passage 256 communicating with both the supply and discharge passages 251 and 252. Parallel discharge passages 257 and 258 extend longitudinally through all of the valve box sections in parallelism with the passages 254 and 255, and communicate with the ends of the valve-receiving bores and with the discharge passage 252. A passage 259 controlled by a relief valve 260 connects the supply passage 251 with the discharge passage 257, so in the event the pressure in the discharge of the low capacity pump becomes too high, the liquid will be automatically by-passed back to the tank. All of the slide valves with the exception of the valve 244, are of the spool type and have spools separated by a central groove 261 and end grooves 262 and 263. The valve 244 has a cylindric body 264 which has provided externally thereon a series of longitudinal grooves 265, 266, 267 and 268, the grooves 265 and 266 being centrally located in overlapping relation while the grooves 267 and 268 are end grooves. The valves 237, 238, 240, 242, 245, 246, 247 and 248 are held in their centrally located positions by oppositely acting coiled springs 269, 269, so that when these valves are in their off-center positions and are released the springs automatically center them. Spring detents 270 serve to hold the valves 239, 241, 243 and 244 in their different positions of adjustment. All of the valves have stems projecting outwardly through packed openings from the opposite ends of the valve box sections, and pivoted operating levers 271 are operatively connected to the valve stems and arranged at the opposite sides of the valve box, thereby to enable operation of the valves from either side of the apparatus. Communicating with the valve-receiving bores 236 of each of the valve box sections are spaced passages 272 and 273 which are connected through conduits to the various hydraulic motors, as will later be explained. The end spools of all of the valves, with the exception of valve 244, are grooved or notched at 274 to enable smoother and more gradual fluid flow past the valves, in a well known manner. The centering coiled springs 269 are arranged between detachable end caps 275 and collars 276 engaging shoulders provided by the end spools of the valves, and these collars are perforated or cut away to provide free liquid flow past the same. As shown in Fig. 24, the valve 244 has axial passages 277 and radial passages 278 and 279, and these passages connect the passages 272 and 273 with the discharge passages 257 and 258 when the valve is in either of its end positions. Spring-loaded relief valves 280 and 281 automatically connect the passages 272 and 273 with the discharge passages 257 and 258 wholly independently of the slide valves, when the pressure in the hydraulic motors becomes, for any reason, too high. The centrally located grooves 265 and 266 on the valve 244 (Fig. 24) control the center by-pass 256 while the end grooves 267 and 268 connect the passages 272 and 273 with the discharge passages 257 and 258 in certain valve positions. In the valve position shown in Fig. 24, the center by-pass 256 is open and the passages 272 and 273 are connected to the discharge passages 257 and 258. In the other valve positions shown (Figs. 22 and 23) for other valves the center by-pass 256 is open and the passages 272 and 273 of those figures are cut off from both the supply and discharge passages, and when these valves are moved endwise in either direction certain ones of the passages 272, 273 are connected to the supply while the others are connected to the discharge, in an obvious manner.

The slide valve 237 controls the steering mechanism for the steering wheels, and the associated passages 272 and 273 communicating with the valve-receiving bore are respectively connected by conduits 282 and 283 to the opposite ends of the hydraulic steering cylinder 168. By control of this valve the steering wheels may be turned in one direction or the other by hydraulic pressure. The slide valve 238 controls the shipper mechanism of the high and low speed transmission means of the traction wheel driving means, and the associated passages 272 and 273 which communicate with the valve-receiving bore in which valve 238 moves are respectively connected by conduits 284 and 285 to the opposite ends of the clutch shipper cylinders 128. By control of this valve the high and low speed clutches 116 and 117 may be alternately applied and released by hydraulic pressure and held in applied position. The slide valve 239 controls the traction wheel driving motors 105, and the associated passages 272 and 273 which communicate with its respective valve-receiving bore are respectively connected by conduits 286 and 287 to the conduits 225 and 226 respectively, so that the motors 105 may be operated in either of opposite directions to propel the apparatus forwardly or rearwardly by the liquid delivered by the low capacity pump 213. The slide valve 240 controls the vertical swinging of the cutter supporting boom 19, and the associated passages 272 and 273 which communicate with the valve-receiving bore are respectively connected by conduits 288 and 289 to the opposite ends of the cylinders 49. By the control of this valve the cylinders 49 may effect raising and lowering of the boom by hydraulic pressure and holding of the boom in adjusted position. The slide valve 241 controls the rotation of the turntable, and the associated passages 272 and 273 which communicate with the valve-receiving bore are respectively connected to conduits 290 and 291 each of which has branch conduits leading to the opposite ends of different cylinders 95. By the control of this valve the turntable may be rotated by hydraulic pressure in either of opposite directions and locked in its adjusted position to swing the cutter supporting boom laterally in either direction and to hold the boom in its laterally adjusted position. The slide valve 242 controls the rotation of the cutter carrying head 23, and the associated passages 272 and 273 which communicate with the valve-receiving bore are respectively connected by conduits 292 and 293 to the head rotating motor 76. Under the control of this valve the head rotating motor may be operated in either of opposite directions to effect cutter head rotation in either of opposite directions and to lock the head in its adjusted position. The slide valve 243 controls the swinging of the kerf cutter about its pivot, and the associated passages 272 and 273 which communicate with the valve-receiving bore are respectively connected to conduits 294 and 295 each of which has branched conduits leading to the opposite ends of different cylinders 67. Under the control of this valve the kerf cutter may be swung in either of opposite directions about its pivot and locked in its adjusted position. The slide valve 244 controls the stabilizing device 12 associated with the rear wheel mounting, and the associated passages 272 and 273 which communicate with the valve-receiving bore are respectively connected through conduits 296 and 297 to the opposite ends of the stabilizer cylinder 175. Under the control of this valve, liquid under pressure may be supplied to either end of the cylinder, discharged from either or both ends of the cylinder, or trapped in both ends of the cylinder, for a purpose elsewhere more fully described. This valve may be slid axially into five different controlling positions, and in the position shown in Fig. 24, the center by-pass 256 is opened and the ends of the cylinder are connected to the tank, so that the stabilizer cylinder may float freely relative to the piston, but the valve may be positioned to supply liquid under pressure to either end of the cylinder to move the cylinder either up or down, or to trap the liquid in the cylinder ends to lock the cylinder and piston against relative movement. The slide valve 245 controls the tilting of the cutter carrying head 27, and the associated passages 272 and 273 which communicate with the valve-receiving bore are respectively connected through conduits 298 and 299 to the opposite ends of the support tilting cylinder 58. Under the control of this valve the cutter carrying head may be swung by hydraulic pressure to tilt the kerf cutter and to hold the kerf cutter in its adjusted position. The slide valve 246 controls one of the levelling devices 11, and the associated passages 272 and 273 which communicate with the valve-receiving bore are respectively connected by conduits 300 and 301 to the opposite ends of one of the cylinders 148. The slide valve 247 controls the other levelling device 11, and the associated passages 272 and 273 which communicate with the valve-receiving bore are respectively connected by conduits 302 and 303 to the opposite ends of the other cylinder 148. Under the control of the valves 246 and 247 the traction wheel mountings may be swung by hydraulic pressure and locked in adjusted position. The slide valve 248 controls the cable reel, and the associated passages 272 and 273 which communicate with the valve-receiving bore are respectively connected through conduits 305 and 304 to an automatic by-pass valve device 306, and through this device to the reel driving motor 195.

The automatic valve device 306, as shown in Figs. 18, 19 and 20, comprises a valve box 307 integral with the lower head of the reel driving motor, and this valve box has a bore 308 in which is reciprocably mounted a slide valve 309. This valve is of the spool type having end spools 310 and 311 separated by an annular groove 312. The valve body has an axial passage 313 plugged at its ends and communicating with the radial passages 314 and 315 opening through the valve spool peripheries. A series of annular grooves 316, 317, 318 and 319 are formed in the walls of the valve containing bore and the end grooves 316 and 319 respectively communicate with the supply and exhaust passages 320 and 321 of the motor. The valve box has chambers 322 and 323 respectively communicable with the grooves 317 and 319 through passages 324 and 325 controlled by spring-pressed check valves 326 and 327. These check valves permit flow from the grooves to the chambers but prevent reverse flow. The end plates of the valve box have annular grooves 328 and 329 which respectively communicate directly with the ends of the valve containing bore 308 and are connected by passages 330 and 331 respectively to the chambers 322 and 323. When the reel driving motor is operating to drive the cable reel in cable winding direction during drive of the traction wheels in the reverse direction, the automatic valve is in the position shown in Fig. 19 and liquid under pressure coming from the conduits 287 and 228 and through one of the tramming motors 105 and then through the conduit 333 may flow from the conduit 304 to the chamber 322 and through passage 330, groove 328, bore 308 and groove 316 to the motor intake passage 320. The motor exhaust takes place through passage 321, groove 319, passage 325, past the check valve 327 to the chamber 323 and thence to the conduit 305 and through conduits 230, 225, 286, past the valve 239, through the valve box and by way of conduit 253 back to the tank. During driving of the traction wheels in the forward direction the cable reel is not driven and the cable may be freely payed out. To prevent an excessive pressure building up within the reel driving motor at that time, the automatic valve device acts automatically to by-pass the liquid, as will now be described. During forward drive of the traction wheels, liquid under pressure coming from the conduit 230 flows through a short portion of the conduit 305 to the chamber 323, and since the check valve 327 is closed liquid flows through passage 331 and groove 329 to the valve containing bore at the right-hand end of the valve, as viewed in Fig. 19 and shifts the valve to the position shown in Fig. 20. The valve will remain in this position because the fluid which may pass through groove 330 will be under a lower pressure, and the end of the valve will moreover be probably at least partially sealed by surface contact with the left end of its chest. Fluid will, in this position of valve 309, pass through passage 332, to the bore 308 and between the end spools of the valve 309, and then through groove 317 and passage 324, past the check valve 326, through chamber 322, and via conduits 304 and 333 to the tramming motor. After leaving the tramming motor the fluid will return by way of conduits 228, 287, the main valve box and conduit 253 to the tank. The reel driving motor supply and exhaust passages 320 and 321 are, when the valve 309 is in the position of Fig. 20, connected together by the by-pass passages 314, 313, and 315 in the valve, so that the motor may rotate freely. It will thus be seen that the reel driving motor may be automatically by-passed during forward driving of the traction wheels. Conduits 334 and 335 connect the traction wheel driving motors 105 to the return conduit 253, so that any leakage past these motors will be returned to the tank. The reel driving motor 195 has a similar leak conduit 336 connected to the return conduit 253. Arranged in the conduits 227 and 228 are manually operated globe valves 337 and 338 whereby the flow of liquid through these conduits may be regulated. For instance, when one of the traction wheels, for any reason, loses its traction by slippage, the increased speed of its driving motor would cause the liquid pressure to drop in the motor supply conduit, and unless flow to the rapidly operating driving motor is restricted or cut off, the driving motor for the other traction wheel would stop. The conduits 225 and 226 are respectively connected by conduits 339 and 340 to the supply conduit 218, and these conduits 339 and 340 are provided with automatic check valves 341 and 342 respectively which permit flow of liquid from the supply conduit 218 to the conduits 225 and 226 but automatically prevent reverse flow. These automatic check valves serve to permit flow of liquid to the traction wheel driving motors 105 in the event the normal supply of liquid in the hydraulic system should fail, for any reason, when the apparatus is moving down a steep incline. The driving motors at such time operate as pumps which serve as brakes. If the automatic check valves were not provided, the driving motors would soon fail to act as brakes, since the liquid would be pumped out, and in this construction the conduits 339 and 340 serve to replenish the liquid supply. Under the control of the four-way valve device 221, the discharge from the high capacity pump 214 may be connected to the wheel driving motors 105 through the conduits 225 and 226, and at times the discharges from both pumps may be conducted to the wheel driving motors. It is accordingly evident that the traction wheels may be driven at three different speeds by controlling the flow of liquid from the pumps to the motors, and these speeds may be changed by the high and low speed transmissions. Also, by regulating the flow of liquid to the motors by the control valves, the wheel driving speeds may be varied as desired. Thereby the apparatus may be propelled through a wide range of low cutting speeds and through a wide range of maneuvering and travelling speeds. It will be understood that the reel may be driven in a winding direction, when the apparatus is stationary, by suitably positioning the valve 248 to supply liquid from the valve box through the conduit 304 and permitting exhaust fluid from the reel driving motor to return through conduit 305. If the valve 248 is reversed, the cable may be freely pulled off the drum.

The general mode of operation of the improved mining apparatus is as follows. The apparatus may be propelled about the mine at a relatively high travelling speed by the motors 105 driving the front traction wheels, and, at that time, the discharge of liquid under pressure from both pumps 213 and 214 may be delivered to the motors. Motive power may be supplied to the apparatus through the conductor cable from the usual trolley power line in the mine entry. The operator may ride at either side of the apparatus on either of the platforms 343 provided for this purpose and so located as to enable convenient access to the control levers of the control valve mechanism 10, and the travelling speed and the turning of the steering wheels may be controlled as desired by the operator. Also the convenient location of the brake levers enables the operator to brake the traction wheels at will so that in the case of an emergency, movement of the apparatus may be controlled, as for instance, when the apparatus is moving along a steep gradient. When it is desired to turn the apparatus into a side passage or room and to leave the mine entry, the conductor cable is attached to the trolley line, and as the apparatus moves into the side passage or room the cable reel mechanism freely pays out the conductor cable, the cable reel revolving freely at that time with the liquid in the motor by-passing through the automatic by-pass device 306. As the apparatus is propelled into the side passage or room from the mine entry, the large capacity pump 214 may be disconnected from the wheel driving motors by the four-way valve device 221, and at that time the motors may be actuated by liquid under pressure supplied thereto from the small capacity pump under the control of the valve 239 of the valve mechanism 10. The discharge from the large capacity pump is at that time conducted back to the tank by way of the connection 222 through the four-way valve device. It will be noted, however, that if desired the discharge from the large capacity pump may either supplant or supplement the low capacity pump discharge to obtain the desired wheel driving speed. When the apparatus is propelled rearwardly in the side passage or room towards the mine entry, the cable reel motor operates to drive the cable reel in winding direction so that, as the apparatus moves rearwardly, the cable is automatically wound up under the control of the valve mechanism 10. In the event that one of the traction wheels slips and the pressure in the discharge of the low capacity pump suddenly drops, due to the rapid rate of operation of the wheel driving motor at that time, the operator may close the proper one of the globe valves 337 and 338 to restrict or cut off entirely liquid flow to that motor which drives the slipping wheel. By the provision of the globe valves the operator may prevent stalling of the apparatus, due to lack of traction of either one of the traction wheels. When the apparatus is moving along a steep gradient and for any reason the pressure in the hydraulic system fails, the wheel driving motors may serve as brakes to retard the traction wheels, and at that time the flow of liquid to the motor is automatically replenished through the check valve controlled conduits 339 and 340.

Figure 27:
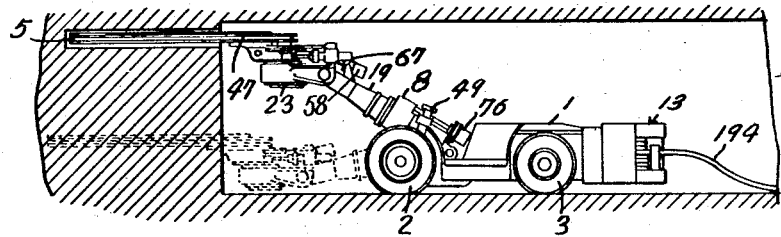
Fig. 27 is a diagrammatic side elevational view showing the mining apparatus in a mine entry with the kerf cutter in horizontal top cutting position.
Figure 28:
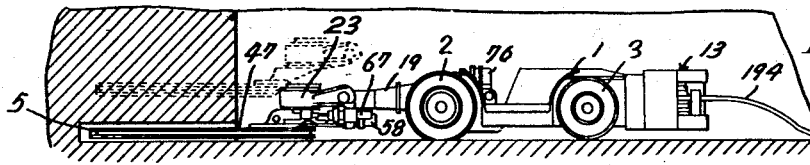
Fig. 28 is a diagrammatic view similar to Fig. 27, showing the kerf cutter in horizontal bottom cutting position.
Figure 29:
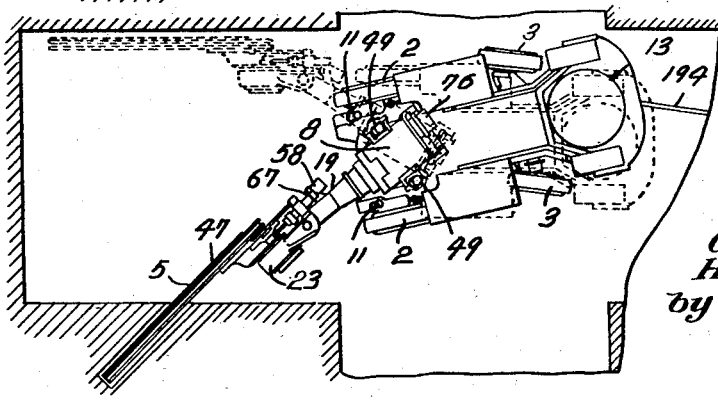
Fig. 29 is a diagrammatic side elevational view showing the apparatus in position to insert a shearing kerf in one of the ribs.

Now referring to the mode of operation of the apparatus during the kerf cutting operation, it will be observed that when it is desired to insert a horizontal cut in the coal seam, the apparatus is moved up to the coal face into the position shown in dotted lines in Fig. 26. The turntable rotating cylinders 95 are then operated to swing the cutter supporting boom laterally and at that time the cutter swinging cylinders are operated to swing the cutter about its pivot relative to the boom. When the parts occupy the dotted line position indicated at A in Fig. 26, the boom tilt cylinders 49 and the cutter tilt cylinder 58 may be concurrently operated to locate the kerf cutter at the desired cutting level. Fig. 27 shows the kerf cutter in horizontal cutting position at the roof level, while Fig. 28 shows the kerf cutter in horizontal cutting position at the floor level, and any desired intermediate cutting level may be obtained by proper adjustment of the kerf cutter. When the kerf cutter is in the position indicated at A in Fig. 26 and liquid under pressure is supplied to the wheel driving motors 105 under the control of the valve 239 of the control valve mechanism, the traction wheels are driven to move the apparatus forwardly toward the coal face at a low cutting speed to sump the kerf cutter in to the coal. As the apparatus moves forwardly, the cable reel freely pays out the conductor cable. When the kerf cutter is sumped into the coal, as indicated in dotted lines at B in Fig. 26, the liquid is trapped in the wheel driving motors to hold the wheels stationary. The cutter swinging cylinders 67 are then operated to swing the kerf cutter about its pivot from the position indicated at B in Fig. 26 to the position indicated at C, to bring the cutter into alinement with the boom. Liquid under pressure is then again supplied to the turntable rotating cylinders and the boom is swung horizontally to move the kerf cutter across the coal face from the position indicated at C to the position indicated at D, and thereafter the cutter swinging cylinders are operated to swing the cutter about its pivot from the position indicated at D to the position indicated at E. The wheel driving motors are then reversed and the apparatus is propelled in a rearward direction to move the cutter from the position indicated at E to the position indicated at F, thereby to withdraw the cutter from the coal. As the apparatus moves rearwardly, the cable reel motor operates to drive the reel in a direction to wind in the conductor cable. In Fig. 29 the apparatus is shown making an angled shear cut in a rib and during this shearing operation the apparatus is steered by the steering wheels so that it moves in an arcuate path while at the same time motion of the turntable, boom and cutter support is properly controlled to cause the sumping of the cutter into the rib, near the roof level. The boom swinging cylinders 49 may then be operated to swing the boom downwardly to move the kerf cutter downwardly in an arcuate path to make a shearing cut. Thereafter the apparatus is propelled rearwardly in the same arcuate path to withdraw the kerf cutter from the rib.

During the kerf cutting operations above described, the levelling cylinders of the levelling devices 11 may be operated to swing the pivoted mountings for the front traction wheels, thereby to level up the main body of the apparatus when the mine floor is uneven, and these levelling cylinders may also be employed to enable the kerf cutter to accommodate itself to a rolling bottom or pitching seam, in a manner obvious to those skilled in the art. When the cutter supporting boom 19 is in a laterally located position at either side of the apparatus, the stabilizer cylinder will be operated to prevent pivoting about a line extending from the front wheel nearer the face to the pivot 161. The stabilizer cylinder thus serves to hold the body of the apparatus rigid during the cutting operation by locking the transverse rear axle and the apparatus body against relative tilting movement. It will be noted that when the machine is standing on all four wheels there is a certain load on the wheels on each side of the machine, part on the front wheel and part on the rear wheel at either side. Now if all the load at the rear end of the machine be concentrated on one of the rear wheels by forcing the establishment of such an angular relation between the rear axle and the rear end of the main body of the machine that only one rear wheel contacts the mine floor, it will be evident that the front wheel at the same side of the machine as the lifted rear wheel must support all the weight of that side of the machine and there is thus a reallocation of weight among the wheels, the weight supported by the rear wheel which still contacts the mine bottom being substantially doubled, and the weight on the front wheel on the other side of the machine being substantially increased. It will further be noted that the provision of a pivoted rear axle with means for locking it in a fixed relation to the machine body provides a very desirable arrangement. If the rear axle be freely pivotable relative to the body the machine can be moved over an uneven bottom with very much less strain and roughness of movement. If, however, the boom be swung to the side with the rear axle thus freely pivotally connected to the machine body, tilting about an obliquely disposed axis extending from the floor-engaging part of the tread of one front wheel to the rear axle pivot may be induced, but if the "stabilizer" be caused to hold the rear axle rigidly with respect to the machine body in such a position that the rear axle is parallel to the axes of rotation of the front wheels, then the occurrence of tilting will be much harder to produce because the axis about which tilting would then occur would be a line at the side of the machine at both front and back—substantially a line connecting the contacts with the bottom of the front and rear wheels at the side of the machine towards or beyond which the boom has been swung. Thus one improved wheel mounting for the frame provides two very useful functions. As above pointed out, if wheel slippage occurs, the proper globe valve 337, 338 may be adjusted to prevent stalling.

As a result of this invention it will be noted that an improved coal mining apparatus is provided especially designed for use in trackless coal mines. It will further be evident that by mounting the mining apparatus on relatively large pneumatic-tired wheels the apparatus may readily move over the mine floor without the use of a mine trackway. Also, it will be noted that an improved mining apparatus is provided capable of performing a number of different functions with efficiency and economy, it being possible to adjust the kerf cutter to cut horizontal kerfs either at the floor or roof levels or any desired intermediate level, or to cut shearing kerfs perpendicular or inclined to the horizontal kerfs, and also to cut horizontal and vertical kerfs in either rib. Further, by the provision of the improved hydraulic operating and controlling means for the various devices of the apparatus, extreme flexibility in operation is obtained. Also, by the provision of the hydraulically operated levelling devices the apparatus may operate on an uneven floor and the kerf cutter can accommodate itself to a rolling bottom or pitching seam, and by associating therewith the hydraulically operated stabilizer device, the possibility of tipping of the apparatus during the kerf cutting operation is substantially reduced. These and other uses and advantages of the improved mining apparatus will be clearly apparent to those skilled in the art.

This application is a division of our application Serial No. 378,728, filed February 13, 1941, and now abandoned.

That portion of the invention hereinabove described, which relates to a land vehicle running gear with a rocking axle or, as it is referred to above, to the stabilizing feature of the invention, constitutes the subject matter of an application filed by us February 21, 1949, Serial No. 77,554.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting the entire quantity of operating fluid for said propulsion motor from the discharge of said pump in series through said motors and back to the sump or for conducting the operating fluid for said propulsion motor from the pump discharge through said propulsion motor only in a direction to effect drive thereof in an opposite direction, and back to the sump, while interconnecting the supply and exhaust connections of said reel driving motor, said last mentioned means including valve means controlling both said supply and said exhaust connections and movable to interconnect them with each other.

2. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting the entire quantity of operating fluid for said propulsion motor from the discharge of said pump in series through said motors and back to the sump or for conducting the operating fluid for said propulsion motor from the pump discharge through said propulsion motor only in a direction to effect drive thereof in an opposite direction, and back to the sump, while interconnecting the supply and exhaust connections of said reel driving motor, said last mentioned means including valve means shifted in position by fluid discharge by said pump.

3. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting the entire quantity of operating fluid for said propulsion motor from the discharge of said pump in series through said motors and back to the sump or for conducting the operating fluid for said propulsion motor from the pump discharge through said propulsion motor only in a direction to effect drive thereof in an opposite direction, and back to the sump, while interconnecting the supply and exhaust connections of said reel driving motor, said last mentioned means including valve means shifted oppositely in accordance with the direction of fluid flow relative to said propulsion motor.

4. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, and means for selectively conducting the entire quantity of operating fluid for said propulsion motor from the discharge of said pump in series through said propulsion motor and said reel driving motor and back to the sump or for conducting the operating fluid for said propulsion motor from said pump discharge through said propulsion motor only, and in the opposite direction through the latter, and back to the sump, while interconnecting the supply and exhaust connections of said reel driving motor to provide for circulation of fluid through said reel driving motor while communication of said reel driving motor with said sump is interrupted, said last mentioned means including a shifter valve having therein a conduit for interconnecting said supply and exhaust connections.

5. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, means for selectively conducting fluid from the discharge of said pump in series through said propulsion motor and said reel driving motor and back to the sump or for conducting fluid from said pump discharge through said propulsion motor only, and in the opposite direction through the latter, and back to the sump while interconnecting the supply and exhaust connections of said reel driving motor, said last mentioned means including valve means for preventing communication of either of said connections with the sump during their interconnection, and means for connecting said pump discharge to the supply connection of said reel driving motor and connecting the exhaust connection of said reel driving motor to the sump while no fluid passes through said propulsion motor.

6. In an apparatus of the character described, the combination comprising a portable base, propelling means for said base including a reversible hydraulic propulsion motor, a pump having an intake and a discharge, a driving motor for said pump, a conductor for conducting operating medium to said driving motor, a reel for said conductor, a hydraulic driving motor for said reel having supply and exhaust connections, a sump, a connection from said sump to the intake of said pump, and means for selectively conducting fluid from the discharge of said pump through said propulsion motor in one direction and then through said reel driving motor, so that the fluid flows through said motors in series, and then back to the sump, or for conducting fluid from said pump discharge past said reel driving motor and in the opposite direction through said propulsion motor and back to the sump, while interconnecting the supply and exhaust connections of said reel driving motor to provide for circulation of fluid through said reel driving motor while communication of said reel driving motor with said sump is interrupted, said last mentioned means including valve means shiftable to establish a connection between said supply and exhaust connections and in another position operative to bypass said reel driving motor.

7. In an apparatus of the character described, the combination comprising a portable base, propelling means for said base including a reversible hydraulic propulsion motor, a plurality of pumps each having an intake and a discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, and means for selectively conducting fluid from the discharge of either of said pumps through said propulsion motor in one direction and then through said reel driving motor so that the fluid flows through said motors in like volumes in series and then back to the sump or for conducting fluid from either of said pump discharges past said reel driving motor and in the opposite direction through said propulsion motor and back to the sump, while interconnecting the supply and exhaust connections of said reel driving motor and cutting the latter off from communication with the sump, said last mentioned means including valve means having passage means for opening a connection between said supply and exhaust connections.

8. In an apparatus of the character described, the combination comprising a portable base, propelling means for said base including a reversible hydraulic propulsion motor, a plurality of pumps each having an intake and discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, and means for selectively conducting the operating fluid for said propulsion motor from the discharge of either or both of said pumps in full quantity through said propulsion motor in one direction and then through said reel driving motor so that the fluid flows through said motors in series and then back to the sump or for conducting fluid from either or both of said pump discharges past said reel driving motor, through portions of the supply and exhaust connections thereof, and in the opposite direction through said propulsion motor and back to the sump, while interconnecting the supply and exhaust connections of said reel driving motor and cutting off the latter from communication with the sump.

9. In an apparatus of the character described, the combination comprising a portable base, propelling means for said base including a reversible hydraulic propulsion motor, a plurality of pumps each having an intake and a discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, means for selectively conducting fluid from the discharge of either of said pumps through said propulsion motor in one direction and then through said reel driving motor so that the fluid flows through said motors in series and then back to the sump or for conducting fluid from either of said pump discharges past said reel driving motor and in the opposite direction through said propulsion motor and back to the sump, while interconnecting the supply and exhaust connections of said reel driving motor, and means for connecting the discharge of one of said pumps but not the other to the supply connection of said reel driving motor and connecting the exhaust connection of said reel driving motor to the sump while no fluid passes through said propulsion motor.

10. In an apparatus of the character described, the combination comprising a portable base, propelling means for said base including a reversible hydraulic propulsion motor, a plurality of pumps each having an intake and discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, means for selectively conducting fluid from the discharge of either or both of said pumps through said propulsion motor in one direction and then through said reel driving motor so that the fluid flows through said motors in series and then back to the sump or for conducting fluid from either or both of said pump discharges past said reel driving motor and in the opposite direction through said propulsion motor and back to the sump while interconnecting the supply and exhaust connections of said reel driving motor, and means for connecting the discharge of one of said pumps but not the other to the supply connection of said reel driving motor and connecting the exhaust connection of said reel driving motor to the sump while no fluid passes through said propulsion motor.

11. In an apparatus of the character described, the combination comprising a portable base, propelling means for said base including a reversible hydraulic propulsion motor, a plurality of pumps each having an intake and a discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps, means for selectively conducting fluid from the discharge of either of said pumps in series through said propulsion motor and said reel driving motor and back to the sump or for conducting fluid from either of said pump discharges through propulsion motor only, and in the opposite direction through the latter, and back to the sump while interconnecting the supply and exhaust connections of said reel driving motor, and means for connecting the discharge of one of said pumps but not the other to the supply connection of said reel driving motor and connecting the exhaust connection of said reel driving motor to the sump while no fluid passes through said propulsion motor.

12. In an apparatus of the character described, the combination comprising a portable base, propelling means for said base including a reversible hydraulic propulsion motor, a plurality of pumps each having an intake and discharge, driving means for said pumps, a conductor for conducting operating medium to the driving means for said pumps, a reel for said conductor, a hydraulic driving motor for said reel having supply and exhaust connections, a sump, connections from said sump to the intakes of said pumps. means for selectively conducting fluid from the discharge of either or both of said pumps in series through said propulsion motor and said reel driving motor and back to the sump or for conducting fluid from either or both of said pump discharges through said propulsion motor only, and in the opposite direction through the latter, and back to the sump while interconnecting the supply and exhaust connections of said reel driving motor, and means for connecting the discharge of one of said pumps but not the other to the supply connection of said reel driving motor and connecting the exhaust connection of said reel driving motor to the sump while no fluid passes through said propulsion motor.

13. In an apparatus for effecting the automatic winding in of a conductor element during the movement in one direction of a motor to which such conductor element furnishes power and for permitting the lengthening of a free portion of such a conductor element during the movement in the opposite direction of such motor, in combination, a reel, a reversible pressure fluid operated driving motor therefor operatively connected thereto, said motor having connections the delivery of fluid through one of which, while fluid is vented through the other of the same, effects driving of the reel in a winding direction, and through each of which fluid is caused to flow in the opposite direction in a closed circuit when the free portion of the conductor is being lengthened, conduits alternatively constituting the one a supply line while the other constitutes a return line, and valve means having means for automatically moving the same to opposite positions when subjected to the fluid supplied through said conduits in turn and in one position effecting a delivery of fluid to said motor to effect drive thereof in a reel-winding direction and in the other position thereof preventing the flow of fluid to the reel-driving motor and interconnecting with each other the connections of the latter.

14. In an apparatus of the character described, the combination comprising a portable base, propelling means for said base including a reversible hydraulic propulsion motor, a pump having an intake and a discharge, driving means for said pump, a conductor conducting operating medium to said pump driving means, a reel for said conductor, a hydraulic driving motor for said reel having supply and exhaust connections, a sump, a connection from said sump to the intake of said pump, and means for selectively conducting the full volume of operating fluid for said propulsion motor from the discharge of said pump in series through said motors and back to the sump to effect drive of both of said motors, or for conducting fluid from said pump discharge through said propulsion motor only, but in the opposite direction from that in which the fluid flows when passing in series through said motors, and back to the sump to effect drive of said propulsion motor, while interconnecting the supply and exhaust connections of said reel driving motor to provide for circulation of fluid therethrough with both of its connections cut off from communication with the sump, said last mentioned means including slide and check valve means actuated by the fluid discharged by said pump.

15. In combination, a portable base, propelling means for said base including a reversible hydraulic propulsion motor, fluid supply means including a pump having an intake and a discharge and a driving motor for said pump, a conductor for conducting operating medium to said driving motor, a reel for said conductor, a reel driving motor having supply and exhaust connections, valve means controlling said supply and exhaust connections and constituting means operative selectively to interconnect said connections or to interrupt connection between them, conduit means connecting said pump discharge with said propulsion motor and said propulsion motor with said valve means and said valve means with the pump intake, and means governed by the direction of fluid flow relative to said valve means for determining its operation.

16. In combination, a portable base, propelling means for said base including a reversible hydraulic propulsion motor, fluid supply means including a pump having an intake and a discharge and a driving motor for said pump, a conductor for conducting operating medium to said driving motor, a reel for said conductor, a reel driving motor having fluid connections, supply to one of which effects rotation of the reel to effect cable winding and discharge through the same one of which attends the drawing off of cable, and means for selectively conducting fluid in series to said propulsion motor to effect base propulsion thereby and then to said reel driving motor via said one connection to effect reel driving or to said propulsion motor only to effect opposite base propulsion with said fluid connections interconnected with each other including valve means operative in opposite positions respectively to interconnect said connections with each other and to disconnect said connections from each other and make a connection from said pump discharge to said one connection, and means including surfaces to which the supply of fluid will effect shifting of said valve means and fluid connections with said surfaces respectively supplied with fluid according to the direction of fluid supply from said pump discharge, for automatically shifting the position of said valve device as the direction of supply to said propulsion motor is changed.

17. In combination, a portable base, propelling means for said base including a reversible hydraulic propulsion motor, fluid supply means including a pump having an intake and a discharge and a driving motor for said pump, a conductor for conducting operating medium to said driving motor, a reel for said conductor, a reel driving motor having fluid connections, supply to one of which effects rotation of the reel to effect cable winding and discharge through the same one of which attends the drawing off of cable, and means for selectively conducting fluid in series to said propulsion motor to effect base propulsion thereby and then to said reel driving motor via said one connection to effect reel driving or to said propulsion motor only to effect opposite base propulsion with said fluid connections interconnected with each other including a valve device operative in opposite positions respectively to interconnect said connections with each other and to disconnect said connections from each other and make a connection from said pump discharge to said one connection, and means including fluid connections with the ends of said valve device respectively supplied with fluid according to the direction of fluid supply from said pump discharge, for automatically shifting the position of said valve device as the direction of supply to said propulsion motor is changed.

18. In combination, a portable base, propelling means for said base including a reversible hydraulic propulsion motor, fluid supply means including a reservoir, a pump having its intake connected with said reservoir, and having a discharge, and a driving motor for said pump, a conductor for conducting operating medium to said driving motor, a reel on said base for said conductor, a reel driving motor having fluid connections the supply of fluid to one of which causes cable winding to be effected, and discharge through the same one of which attends drawing off of cable from said reel, fluid conduits selectively effective as supply and return conduits, valve means for controlling the connections of said conduits one to the pump discharge and the other to the reservoir and vice versa, one of said conduits leading to said propulsion motor, a connection from said propulsion motor, a valve box to which said last mentioned connection leads, another connection from said valve box connected with the other of said conduits, connections from said valve box to the fluid connection of said reel driving motor, a valve in said valve box, connections from said conduits to the opposite ends of said valve, means including a flow conduit on said valve for interconnecting said first mentioned conduits, and means including another flow conduit on said valve for interconnecting the fluid connections of said reel driving motor.

19. In combination, a portable base, propelling means for said base including a reversible hydraulic propulsion motor, fluid supply means including a reservoir, a pump having its intake connected with said reservoir, and having a discharge, and a driving motor for said pump, a conductor for conducting operating medium to said driving motor, a reel on said base for said conductor, a reel driving motor having fluid connections the supply of fluid to one of which causes cable winding to be effected, and discharge through the same one of which attends drawing off of cable from said reel, fluid conduits selectively effective as supply and return conduits, valve means for controlling the connections of said conduits one to the pump discharge and the other to the reservoir and vice versa, one of said conduits leading to said propulsion motor, a connection from said propulsion motor, a valve box to which said last mentioned connection leads, another connection from said valve box connected with the other of said conduits, connections from said valve box to the fluid connections of said reel driving motor, a valve in said valve box, connections from said conduits to the opposite ends of said valve, a check valve controlled connection between one of the connections from the valve box to the reel driving motor and one of said first mentioned conduits, check valve controlled means including a flow conduit on said valve for interconnecting said first mentioned conduits, and means including another flow conduit on said valve for interconnecting the fluid connections of said reel driving motor.

20. In an apparatus of the character described, the combination comprising a portable base, propelling means for said base including a pair of reversible hydraulic propulsion motor, a pump having an intake and a discharge, driving means for said pump, a conductor conducting operating medium to said pump driving means, a reel for said conductor, a hydraulic driving motor for said reel having supply and exhaust connections, a sump, a connection from said sump to the intake of said pump, and means for selectively conducting fluid from the discharge of said pump simultaneously through one of said propulsion motors and back to the sump, and in series through the other of said propulsion motors and said reel driving motor in equal quantities and back to the sump, or for conducting fluid from said pump discharge in the opposite direction through said propulsion motors only, in parallel, and back to the sump, while interconnecting the supply and exhaust connections to said reel driving motor.

21. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a pair of reversible hydraulic propulsion motors, a sump, a connection from said sump to the intake of said pump, and means for selectively conducting fluid from the discharge of said pump simultaneously through one of said propulsion motors and back to the sump and in series through the other of said propulsion motors and said reel driving motor and back to the sump, or for conducting fluid from the pump discharge through said propulsion motors only in a direction to effect drive thereof in an opposite direction, and back to the sump, while interconnecting the supply and exhaust connections of said reel driving motor and cutting said reel driving motor off from communication with the sump.

22. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting fluid from the discharge of said pump in series through said motors and back to the sump or for conducting fluid from the pump discharge through said propulsion motor only in a direction to effect drive thereof in an opposite direction, and back to the sump, while interconnecting at said reel driving motor the supply and exhaust connections of said reel driving motor, said last mentioned means including valve means located at said reel driving motor and controlling both the supply and exhaust connections therefor and when interconnecting said connections establishing a parallel connection past said reel driving motor between said pump and said propulsion motor.

23. In an apparatus of the character described, the combination comprising a portable base, a pump on said base having an intake and a discharge, driving means for said pump, a conductor for conducting operating medium to said driving means, a reel for said conductor, a hydraulic driving motor for said reel having supply and exhaust connections, propelling means for said base including a reversible hydraulic propulsion motor, a sump, a connection from said sump to the intake of said pump, and means for selectively conducting fluid from the discharge of said pump in series through said motors and back to the sump or for conducting fluid from the pump discharge through said propulsion motor only in a direction to effect drive thereof in an opposite direction, and back to the sump, while interconnecting the supply and exhaust connections of said reel driving motor to provide for circulation of fluid through said reel driving motor while communication of said reel driving motor with said sump is interrupted, said last mentioned means including valve means actuated by the fluid discharged by said pump and differently positioned in accordance with the direction of fluid supply to said propulsion motor.

CLYDE P. BALDWIN.
HARRY H. VANDERZEE.

REFERENCES CITED

The following references are of record in the file of this patent:

UNITED STATES PATENTS

| Number | Name | Date |
| --- | --- | --- |
| 1,045,903 | Smith | Dec. 3, 1912 |
| 1,110,995 | Abbe | Sept. 15, 1914 |
| 1,926,692 | Tarbox | Sept. 12, 1933 |
| 1,963,091 | Jenkins | June 19, 1934 |
| 2,126,172 | Cartlidge | Aug. 9, 1938 |
| 2,173,068 | Schroeder | Sept. 12, 1939 |
| 2,209,608 | Nye et al. | July 30, 1940 |
| 2,228,411 | Sheridan | Jan. 14, 1941 |
| 2,229,086 | Joy | Jan. 21, 1941 |
| 2,282,749 | Russell | May 12, 1942 |
| 2,301,098 | Twyman | Nov. 3, 1942 |
| 2,316,521 | Lee | Apr. 13, 1943 |
| 2,378,892 | Arentzen | June 26, 1945 |